US012652075B1

(12) United States Patent
Yanamandra et al.

(10) Patent No.: US 12,652,075 B1
(45) Date of Patent: Jun. 9, 2026

(54) DUAL-MODE RECEIVER TERMINATION DETECTION CIRCUIT

(71) Applicant: Cadence Design Systems, Inc., San Jose, CA (US)

(72) Inventors: Satya Someswara Kaushik Yanamandra, Gaithersburg, MD (US); Emmanuel Hagan, Fuquay-Varina, NC (US); James Dennis Vandersand, Jr., Chapel Hill, NC (US)

(73) Assignee: Cadence Design Systems, Inc., San Jose, CA (US)

( * ) Notice: Subject to any disclaimer, the term of this patent is extended or adjusted under 35 U.S.C. 154(b) by 51 days.

(21) Appl. No.: 19/008,373

(22) Filed: Jan. 2, 2025

(51) Int. Cl.
　　*H04B 3/14*　　　(2006.01)
　　*H04B 3/46*　　　(2015.01)
　　*H04L 25/02*　　　(2006.01)

(52) U.S. Cl.
　　CPC ................ *H04B 3/14* (2013.01); *H04B 3/46* (2013.01); *H04L 25/0272* (2013.01)

(58) Field of Classification Search
　　CPC .......... H04B 3/14; H04B 3/46; H04L 25/0272
　　See application file for complete search history.

(56) References Cited

U.S. PATENT DOCUMENTS 6,703,866 B1 *　3/2004　Arimilli ........ H03K 19/017581
　　　　　　　　　　　　　　　　　　326/86
8,175,173 B2 *　5/2012　Shetty ................... H04W 52/52
　　　　　　　　　　　　　　　　　　375/257
2008/0273623 A1 *　11/2008　Chung ................ H04L 25/0264
　　　　　　　　　　　　　　　　　　375/295

* cited by examiner

*Primary Examiner* — David S Huang
(74) *Attorney, Agent, or Firm* — Schwegman Lundberg & Woessner, P.A.

(57) ABSTRACT

Examples relate to a receiver termination detection circuit for wireline datalinks. A transmitter circuit includes positive and negative output nodes coupled through a channel to a receiver. A detection circuit comprises programmable pull-up and pull-down resistors coupled to the output nodes, and voltage comparators with independent reference voltage inputs. A mode selection input selects between single-ended and differential detection modes. Control logic drives the output nodes concurrently in single-ended mode and differentially in differential mode. The comparator outputs are sampled after a programmable time delay to detect receiver termination. The circuit supports both AC-coupled single-ended and DC-coupled differential termination detection while maintaining common-mode voltage during transitions to normal operation.

20 Claims, 16 Drawing Sheets

DUAL-MODE RECEIVER TERMINATION DETECTION CIRCUIT

TECHNICAL FIELD

The present disclosures relate to wireline data communication circuits and, in some examples, to circuits and systems to detect receiver termination conditions in both AC-coupled single-ended and DC-coupled differentially terminated datalinks.

BACKGROUND

Wireline data communication systems enable high-speed data transfer between electronic devices through physical transmission channels. These systems utilize various link architectures including AC-coupled and DC-coupled connections with different termination schemes at the transmitter and receiver ends. Modern wireline interfaces support multiple protocols and standards such as PCIe and USB, each with specific requirements for signal integrity, power consumption, and board area utilization. The physical connections between transmitters and receivers typically incorporate impedance matching techniques to manage signal reflections at interface boundaries, with industry-standard implementations often using 50-ohm characteristic impedance for channels and terminations.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1A:
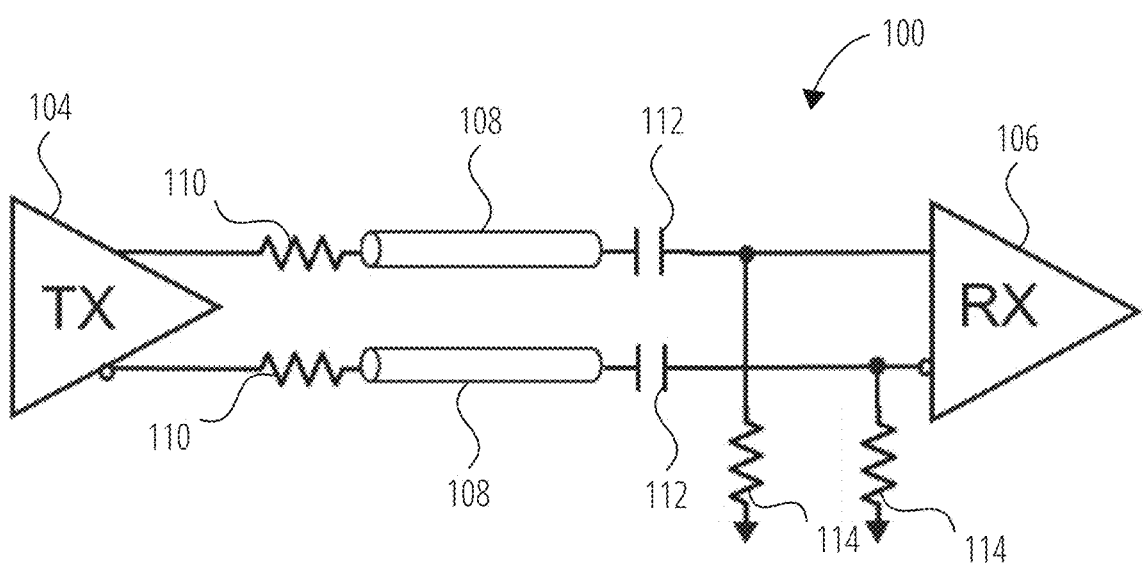
FIG. 1A and FIG. 1B are circuit diagrams illustrating AC coupled wireline datalinks with single-ended receiver termination, according to some examples.

Examples described herein relate to devices and methods for detecting both single-ended and differential receiver termination. Some examples described herein may address one or more technical challenges in high-speed wireline communication systems by providing a reconfigurable dual-mode receiver termination detection circuit that supports multiple link architectures.

Modern computing systems utilize high-speed serial interfaces, such as PCIe and USB, to transfer data between components. These interfaces require proper termination at the receiver end to maintain signal integrity and enable reliable communication. A termination detection circuit, typically coupled to the transmitter circuit of the datalink, verifies whether a receiver is properly connected and terminated before initiating data transmission from the transmitter circuit.

Traditional wireline datalinks employ either AC-coupled or DC-coupled architectures with different termination schemes. AC-coupled links use capacitors to block DC components while passing AC signals, allowing independent common-mode voltage levels between transmitter and receiver. These links typically use single-ended termination, in which each differential input is independently terminated to ground through 50-ohm resistors. In some examples, the AC coupling capacitors range from 100-400 nanofarads.

In contrast, DC-coupled links eliminate the coupling capacitors, reducing startup latency and board area. These links often use differential termination, in which a single resistor (or more than one resistor in series) connects between the positive and negative inputs. The differential termination approach can reduce transmitter power consumption by approximately 50% compared to single-ended termination. For example, the resistor or resistors used in differential termination can provide twice the impedance of the single-ended architecture, thereby reducing current drain by 50%. In some examples, a single-ended configuration may use resistors of 50 ohms each, whereas a differential configuration may use a resistor or resistors providing 100 ohms of impedance.

Examples of reconfigurable dual-mode detection circuits described herein include programmable pull-up and pull-down resistors connected to the transmitter output nodes, independent voltage comparators for the positive and negative output nodes, and digital control logic. A mode selection input provides a pre-configured value to configure the circuit for either single-ended or differential detection operation.

In single-ended detection mode, the circuit drives both transmitter outputs concurrently and compares them to a common reference voltage of approximately 0.75 times the supply voltage. Valid termination is detected when both comparator outputs indicate proper impedance levels, such as between 40-60 ohms in some examples. Typically, a valid termination impedance (e.g., 40-60 ohms) is much lower than an invalid or OFF state termination impedance (e.g., 10,000 ohms). Valid termination may be defined by the standard being used, such as PCIe or USB, or new or emerging standards of SerDes designs using one or more such standards.

In differential detection mode, the circuit generates complementary voltage steps on the outputs and uses separate reference voltages: in some examples, the reference voltages are approximately 0.625 times the supply voltage (0.625*Vdd) for the positive side and 0.375 times the supply voltage (0.375*Vdd) for the negative side. Valid differential termination is detected when the impedance between outputs is at a valid impedance level, such as 80-120 ohms in some examples (dependent upon the standard).

The programmable resistors and reference voltages allow adjustment of detection timing and voltage margins. For AC-coupled operation, the circuit may use a longer detection time of approximately 100 microseconds to account for coupling capacitor charging. DC-coupled detection may complete in a much shorter time, such as about 1 microsecond, since no capacitor charging is required. In some examples, a programmable time delay can be used to adjust the detection timing. The digital control block uses a delay, such as data flip-flops (also referred to as D flip-flops) to sample the comparator outputs after the programmable time delay.

Upon detecting valid termination, the circuit can transition from the detection mode (e.g., single-ended detection mode or differential detection mode) to a normal operating mode to enable normal transmitter operation. In some examples, this transition can be performed while maintaining common-mode voltage levels at the outputs.

The reconfigurable dual-mode approach to receiver termination detection can be deployed to support multiple interface standards and termination schemes within a single design. System designers can optimize or improve power consumption and/or signal integrity by selecting AC or DC coupling, and selecting single-ended or differential termination, based on their specific requirements. The dual-mode receiver termination detection circuit can provide reliable detection across process variations through programmable voltage and timing parameters.

Figure 1B:
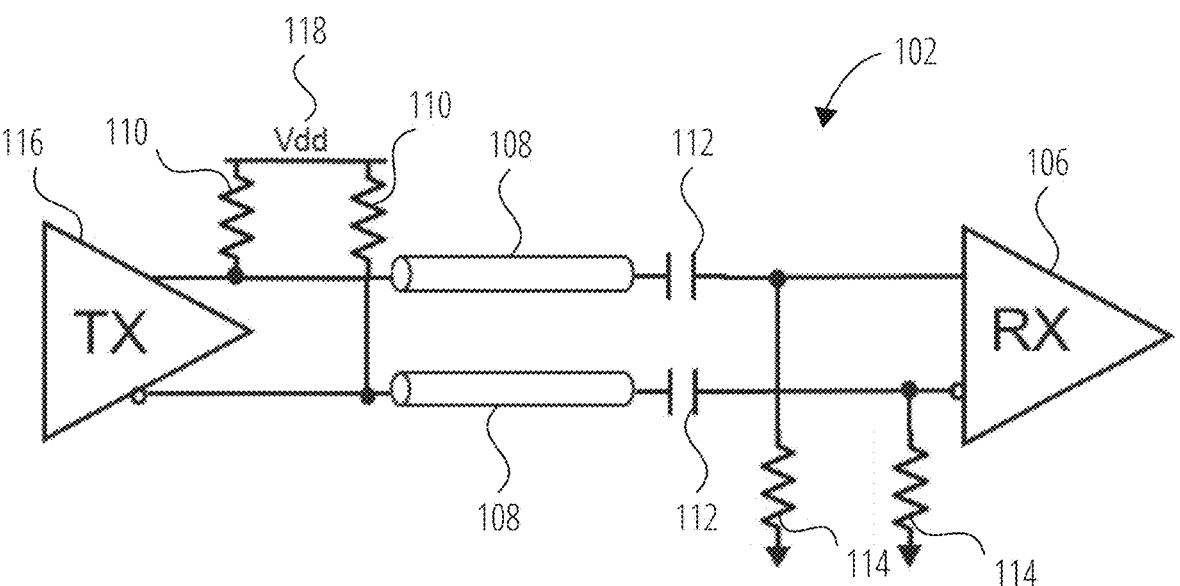

FIG. 1A and FIG. 1B are circuit diagrams illustrating AC coupled wireline datalinks with single-ended receiver termination. In FIG. 1A, a wireline datalink 100 is shown having a series terminated transmit driver 104 transmitting to a single-ended shunt-terminated receiver 106 over a pair of (e.g., positive and negative) channels 108. The transmitter circuit on the left also includes two transmit resistors 110, and the receiver circuit on the right also includes a pair of capacitors 112 and a pair of receiver resistors 114. It will be appreciated that the capacitors 112, which can be quite large, may in some examples be part of the channel 108 or incorporated into a circuit board housing the receiver circuit, rather than being part of the receiver circuit itself.

The series terminated transmit driver 104 interfaces with the channels 108 through the transmit resistors 110, which provide impedance matching to minimize signal reflections. The channels 108 (e.g., a single differential channel) connects to the single-ended shunt-terminated receiver 106 through AC coupling capacitors 112, which block DC components of the signal while allowing AC signal transmission. The single-ended shunt-terminated receiver 106 employs single-ended shunt termination through receiver resistors 114 connected to ground.

In some examples, the transmit resistors 110 and receiver resistors 114 have impedance values of approximately 50 ohms to match the characteristic impedance of the channels 108. The AC coupling capacitors 112 may have values between 100-400 nanofarads.

In FIG. 1B, a wireline datalink 102 shows an alternative implementation using a shunt terminated transmit driver 116 instead of the series terminated transmit driver 104 of FIG. 1A. The shunt terminated transmit driver 116 connects to a supply voltage (Vdd 118) through transmit resistors 110 acting as termination resistors. In some examples, the shunt terminated architecture of wireline datalink 102 may be used with current-mode logic (CML) drivers, while the series terminated architecture of wireline datalink 100 may be used with CMOS drivers.

Both datalink implementations (wireline datalink 100 and wireline datalink 102) support single-ended receiver termination, in which the receiver terminates each differential input independently to ground through receiver resistors 114. Single-ended receiver termination allows independent detection of termination on positive and negative inputs, as required by some standards like PCIe.

The AC coupling through the capacitors 112 provides DC isolation between transmitter and receiver, enabling operation with different common-mode voltage levels. However, in some cases the AC coupling capacitors 112 can introduce startup latency, as they must charge to appropriate voltage levels before data transmission can begin.

Figure 2A:
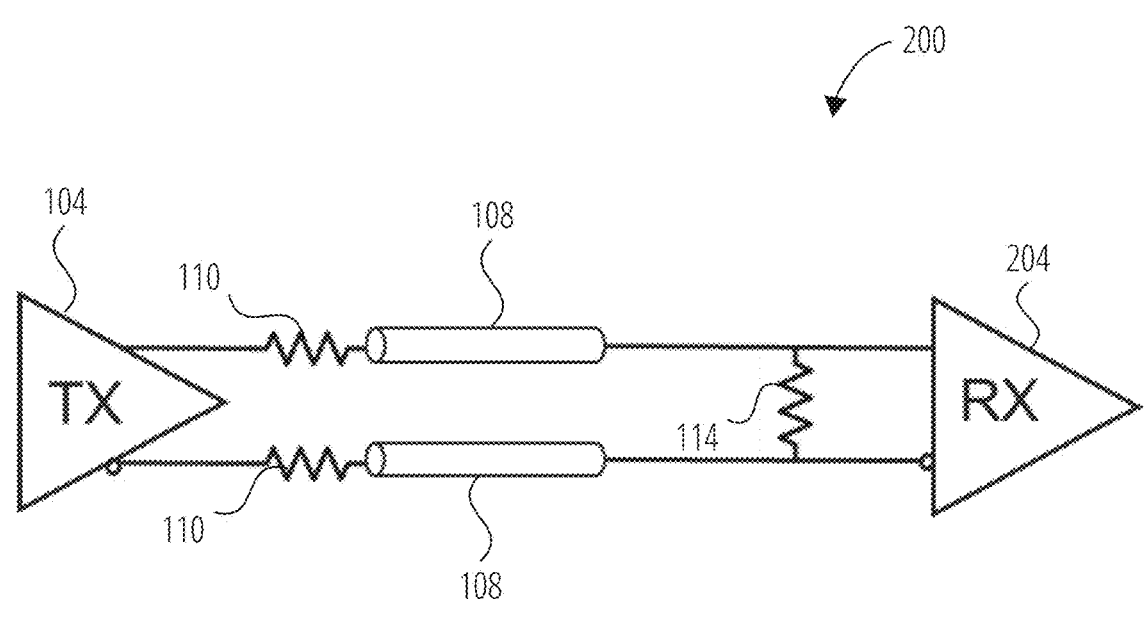
FIG. 2A and FIG. 2B are circuit diagrams illustrating DC coupled wireline datalinks with differential receiver termination, according to some examples.
Figure 2B:
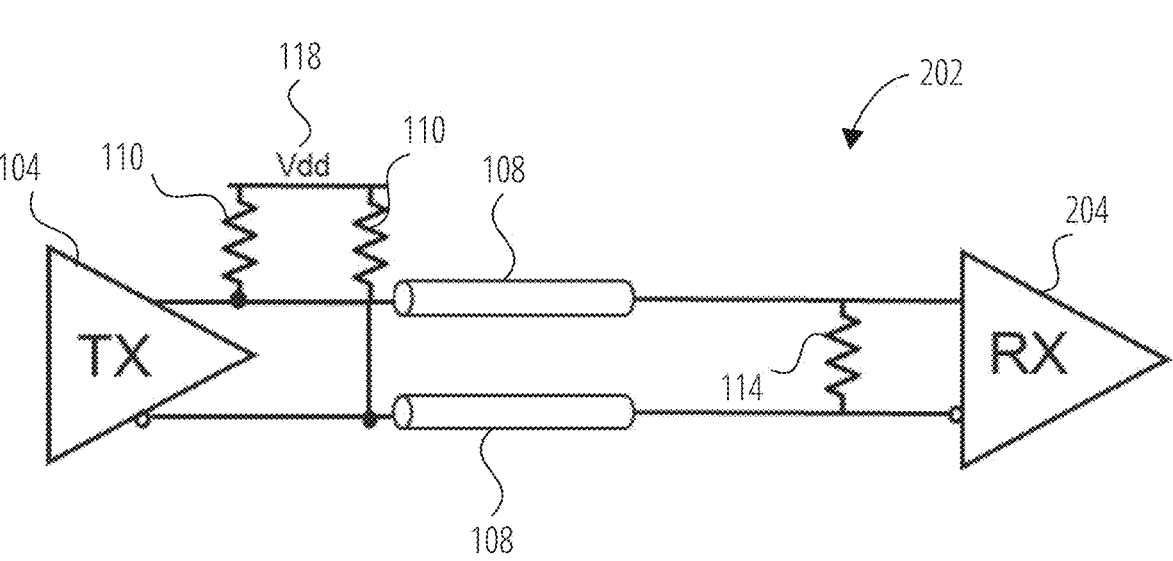

FIG. 2A and FIG. 2B are circuit diagrams illustrating DC coupled wireline datalinks with differential receiver termination. In FIG. 2A, a wireline datalink 200 is shown having a series terminated transmit driver 104 transmitting data to a differential shunt-terminated receiver 204 over a pair of channels 108. As in the wireline datalink 100 of FIG. 1A, the transmit circuit includes two transmit resistors 110. The differential termination configuration of the receiver also includes a single receiver resistor 114 (or multiple resistors in parallel in some examples, as described above).

The transmit resistors 110 provide impedance matching to minimize signal reflections. The channels 108 connect directly to the differential shunt-terminated receiver 204 without AC coupling capacitors, potentially reducing latency during link startup compared to AC-coupled implementations.

The differential shunt-terminated receiver 204 employs shunt termination through a single receiver resistor 114 connected between the positive and negative inputs. In some examples, the differential termination resistance is approximately twice the value of single-ended termination, such as between 80-120 ohms for a 50-ohm characteristic impedance channel 108.

In FIG. 2B, a wireline datalink 202 shows an alternative implementation using a shunt terminated transmit driver connected to a supply voltage (Vdd 118) through termination resistors 110.

In some examples, the shunt terminated architecture of the transmitter of wireline datalink 202 may be used with current-mode logic (CML) drivers, whereas the series terminated architecture of the transmitter of wireline datalink 200 may be used with CMOS drivers. Both implementations can support differential receiver termination, in which a single receiver resistor 114 acting as a termination resistor connects between the positive and negative inputs of the differential shunt-terminated receiver 204.

In some examples, the use of differential receiver termination reduces transmitter power consumption by approximately 50% compared to single-ended receiver termination by eliminating the DC current path to ground. However, the use of a DC-coupled architecture, such as wireline datalink 200 or wireline datalink 202, can make the receiver common-mode voltage dependent on the transmitter supply voltage and termination values.

The use of DC coupling can eliminate the need for large coupling capacitors, reducing board area in densely scaled systems. This differentially terminated, DC coupled architecture is used in standards like USB that prioritize lower power consumption and can tolerate relaxed return loss requirements at the channel-receiver boundary.

Figure 3:
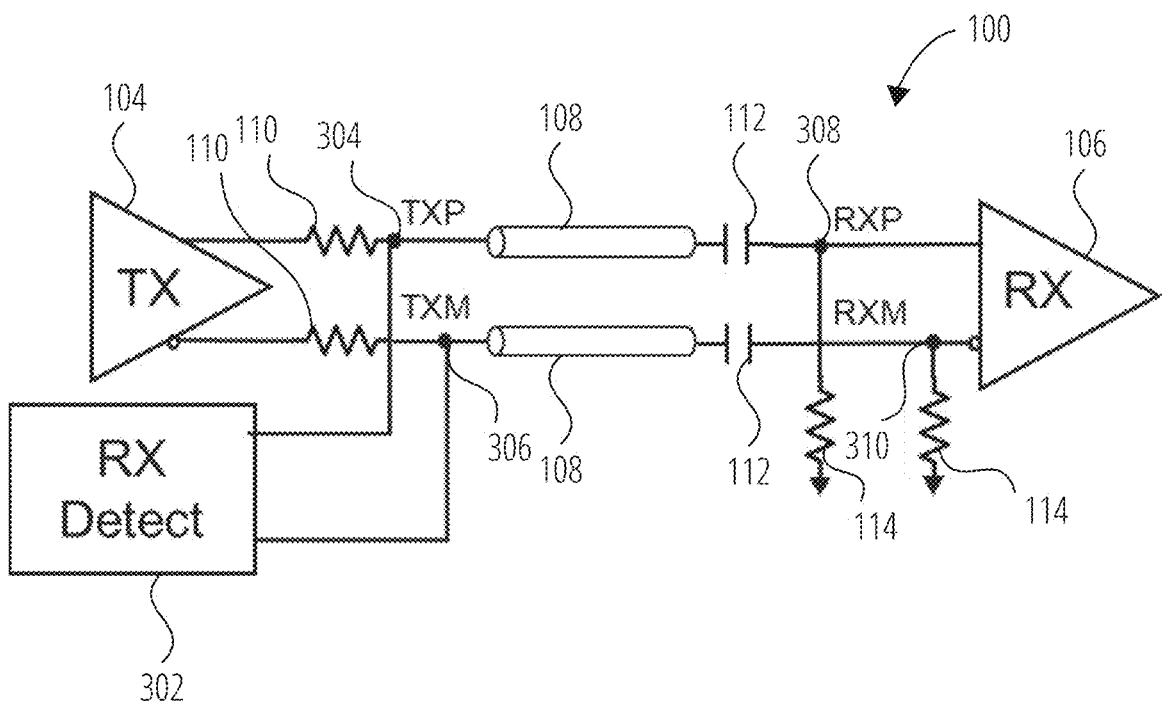
FIG. 3 is a circuit diagram illustrating a receiver termination detection circuit connected to outputs of a transmitter circuit, according to some examples.

FIG. 3 is a circuit diagram illustrating a receiver termination detection circuit 302 connected to outputs of the transmitter circuit of a wireline datalink (shown as wireline datalink 100).

The wireline datalink 100 includes the same components as the example shown in FIG. 1A: a series terminated transmit driver 104 connected to a single-ended shunt-terminated receiver 106 through a channel 108, using transmit resistors 110, capacitors 112, and receiver resistors 114 as described above. The positive output of the transmitter circuit is shown as positive transmit node 304 (TXP, or transmit plus); the negative output is negative transmit node 306 (TXM, or transmit minus). On the receiver side of the channels 108, after the capacitors 112, the corresponding nodes are the positive receive node 308 (RXP, or receive plus) and negative receive node 310 (RXM, or receive minus).

A receiver termination detection circuit 302 connects to both the positive transmit node 304 and negative transmit node 306. The receiver termination detection circuit 302 monitors these nodes to determine if valid receiver termination is present before enabling data transmission. The positive receive node 308 and negative receive node 310 connect to the single-ended shunt-terminated receiver 106 through receiver resistors 114 that provide single-ended termination to ground.

In some examples, the transmit resistors 110 have impedance values of approximately 50 ohms to match the channel 108 characteristic impedance. The AC coupling capacitors 112 may have values between 100-400 nanofarads to provide DC isolation while passing high-speed data signals. In various examples, the receiver resistors 114 may be configured for either the illustrated single-ended termination (e.g., 40-60 ohms from either the negative receive node 310 or positive receive node 308 to ground) or differential termination as shown in wireline datalink 200 of FIG. 2A (e.g., 80-120 ohms between the negative receive node 310 and positive receive node 308).

The receiver termination detection circuit 302 operates by monitoring voltage levels at negative transmit node 306 and positive transmit node 304 while the series terminated transmit driver 104 is disabled. For single-ended detection, the receiver termination detection circuit 302 drives both nodes 306 and 304 concurrently and compares them to a common reference voltage. For differential detection, the circuit generates complementary voltage steps on the nodes 306 and 304 and uses separate reference voltages for comparison. The detection results determine whether valid termination is present before enabling normal transmitter operation.

Figure 4:
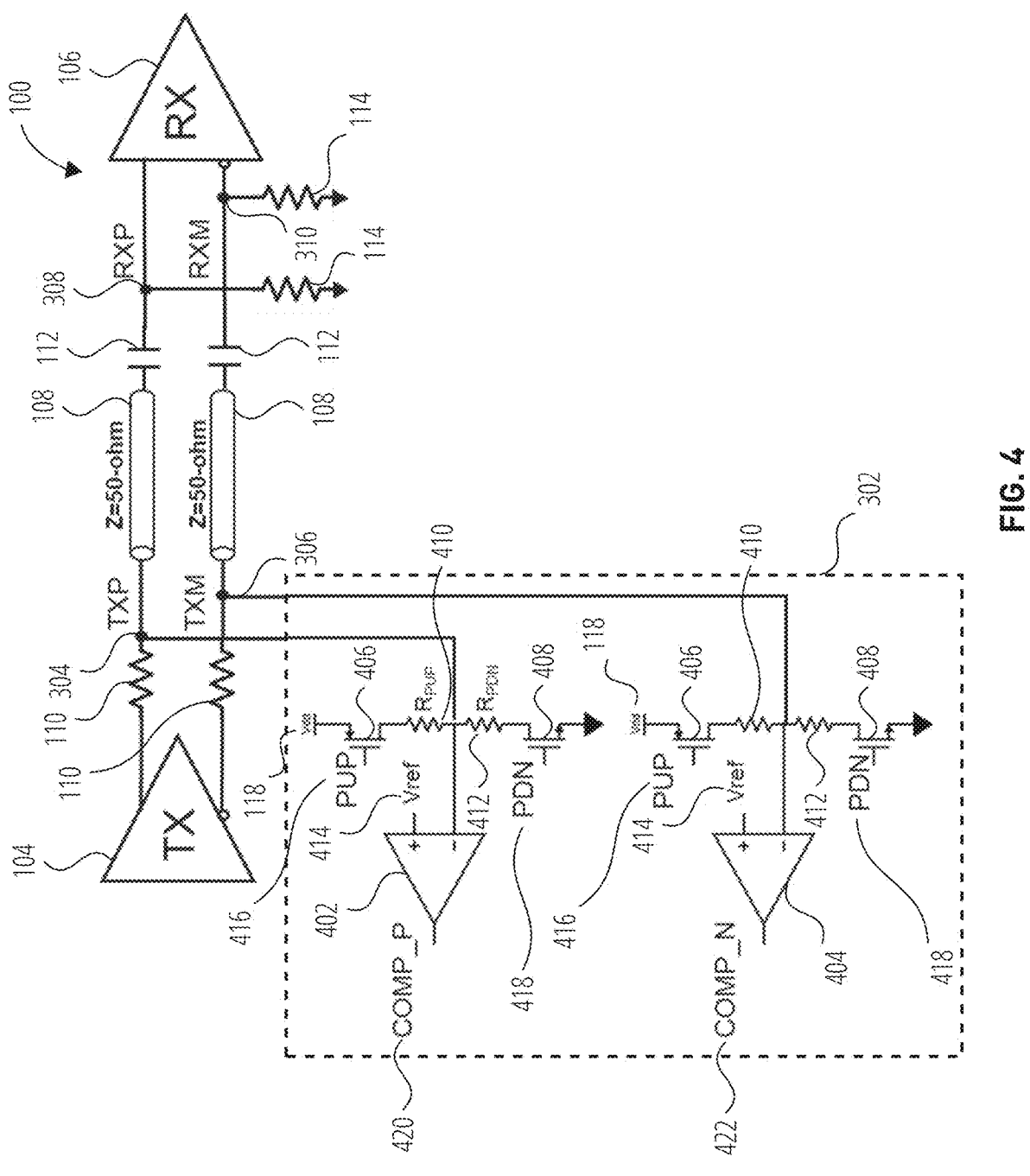
FIG. 4 is a circuit diagram illustrating a single-mode receiver termination detection circuit implementation, according to some examples.

FIG. 4 is a circuit diagram illustrating a single-mode receiver termination detection circuit 302 implementation. The receiver termination detection circuit 302 is shown coupled to the outputs negative transmit node 306 (TXM) and positive transmit node 304 (TXP) of the transmitter circuit of a wireline datalink 100 connected through 50-ohm characteristic impedance channels 108 to a single-ended shunt-terminated receiver 106. The series terminated transmit driver 104 interfaces with the channels 108 through transmit resistors 110, while AC coupling capacitors 112 provide DC isolation to the receiver inputs positive receive node 308 (RXP) and negative receive node 310 (RXM).

The receiver termination detection circuit 302 includes positive and negative voltage comparators (positive comparator 402 and negative comparator 404) that compare the transmit node voltages to reference voltages 414 (Vref). Pull-up transistors 406 and pull-down transistors 408 connect to the transmit nodes negative transmit node 306 and positive transmit node 304 through pull-up resistors 410 and pull-down resistors 412 respectively. The pull-up and pull-down transistors are controlled by pull-up voltage 416 and pull-down voltage 418 signals. In some examples, the pull-up transistors 406 and pull-down transistors 408 all have resistances of approximately 10 kiloohms, or another suitable value much higher than the impedance values indicative of valid receiver termination.

The reference voltage 414 connects to the positive input of comparator 402 and positive input of comparator 404. In some examples, the reference voltage 414 is set to approximately 0.75 times the supply voltage (Vdd 118) for single-ended termination detection. The comparator outputs (positive comparator output 420 and negative comparator output 422) indicate whether valid termination is detected based on the voltage levels at the transmit nodes 306 and 304.

When the circuit is in a detection mode, the series terminated transmit driver 104 is disabled, while the pull-up and pull-down transistors drive the transmit nodes 304 and 306. The common-mode voltage is set by ratio of $R_{PUP}$ of pull-up resistor 410 and $R_{PDN}$ of pull-down resistor 412, which typically matches with normal operating common-mode voltage when the series terminated transmit driver 104 is enabled and operating in normal operating mode to transmit data.

Once the receiver detection operation starts, the voltage levels at the transmit nodes 304 and 306 depend on the receiver termination resistance-a valid termination of, e.g., 40-60 ohms produces different voltage levels compared to an invalid high-impedance termination, e.g., above 10 kiloohms. The comparator outputs 420 and 422 are sampled to determine if valid termination is present. If valid termination is determined to be present, the circuit can transition from the detection mode into a normal operating mode to transmit data over the channel.

Figure 5:
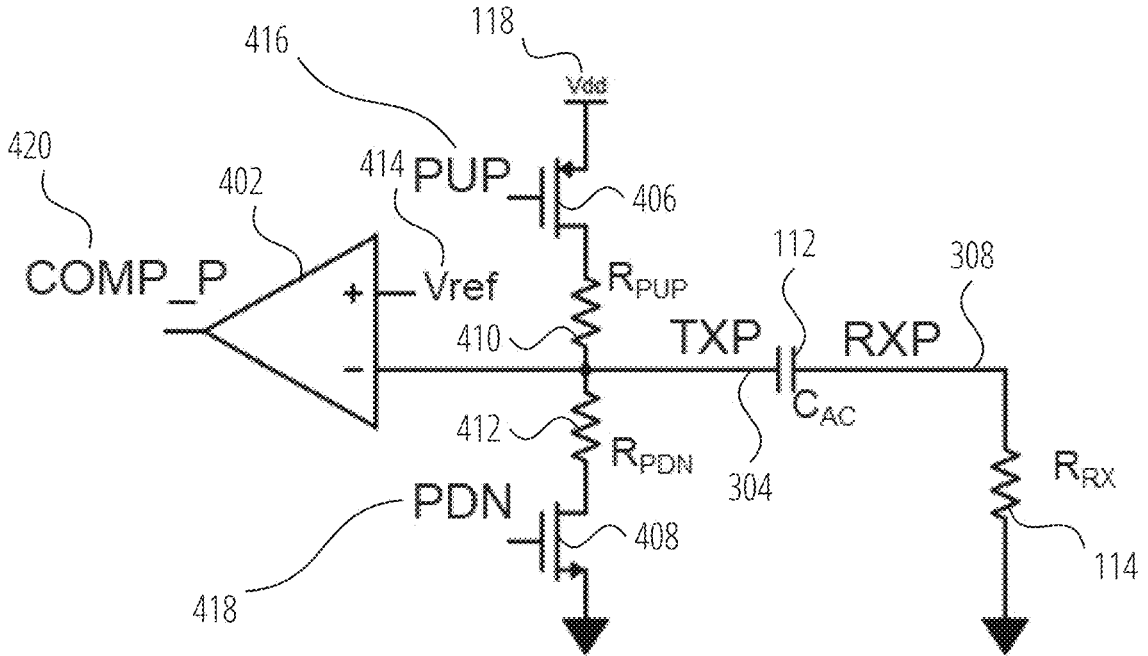
FIG. 5 is a circuit diagram illustrating operation of the receiver termination detection circuit of FIG. 4, according to some examples.

FIG. 5 is a circuit diagram illustrating operation of the receiver termination detection circuit 302 of FIG. 4 for detecting termination of a single-ended receiver in a wireline datalink.

The circuit comprises a positive comparator 402 having its negative input connected to a positive transmit node 304 (TXP) and its positive input connected to a reference voltage 414.

A pull-up transistor 406 connects between a supply voltage (Vdd 118) and the positive transmit node 304 through a pull-up resistor 410 ($R_{PUP}$). A pull-down transistor 408 ($R_{PDN}$) connects between the positive transmit node 304 and ground. The pull-up and pull-down transistors 406, 408 are controlled by pull-up voltage 416 (PUP) and pull-down voltage 418 (PDN) signals respectively.

The positive transmit node 304 (TXP) connects through an AC coupling capacitor (CAC) 112 to a positive receive node 308 (RXP). The positive receive node 308 connects to a receiver resistor 114 ($R_{RX}$) that provides single-ended termination to ground.

The positive comparator output 420 (COMP_P) indicates whether valid termination is detected based on the voltage level at positive transmit node 304 compared to the reference voltage 414. In some examples, during high-impedance detection, when the resistance of receiver resistor 114 is greater than 10 kiloohms, the voltage at positive transmit node 304 charges to approximately 0.75*Vdd when pull-down voltage 418 transitions from Vdd 118 to ground, while pull-up voltage 416 remains at ground. This voltage level exceeds the reference voltage 414 of 0.75*Vdd 118, causing the positive comparator output 420 to indicate invalid termination. The circuit operates similarly for detecting valid termination in the range of 40-60 ohms, where the TXP voltage remains below the reference threshold. Further details of the voltage levels over time used to identify valid or invalid termination are shown in FIG. 6A and FIG. 6B.

Figure 6A:
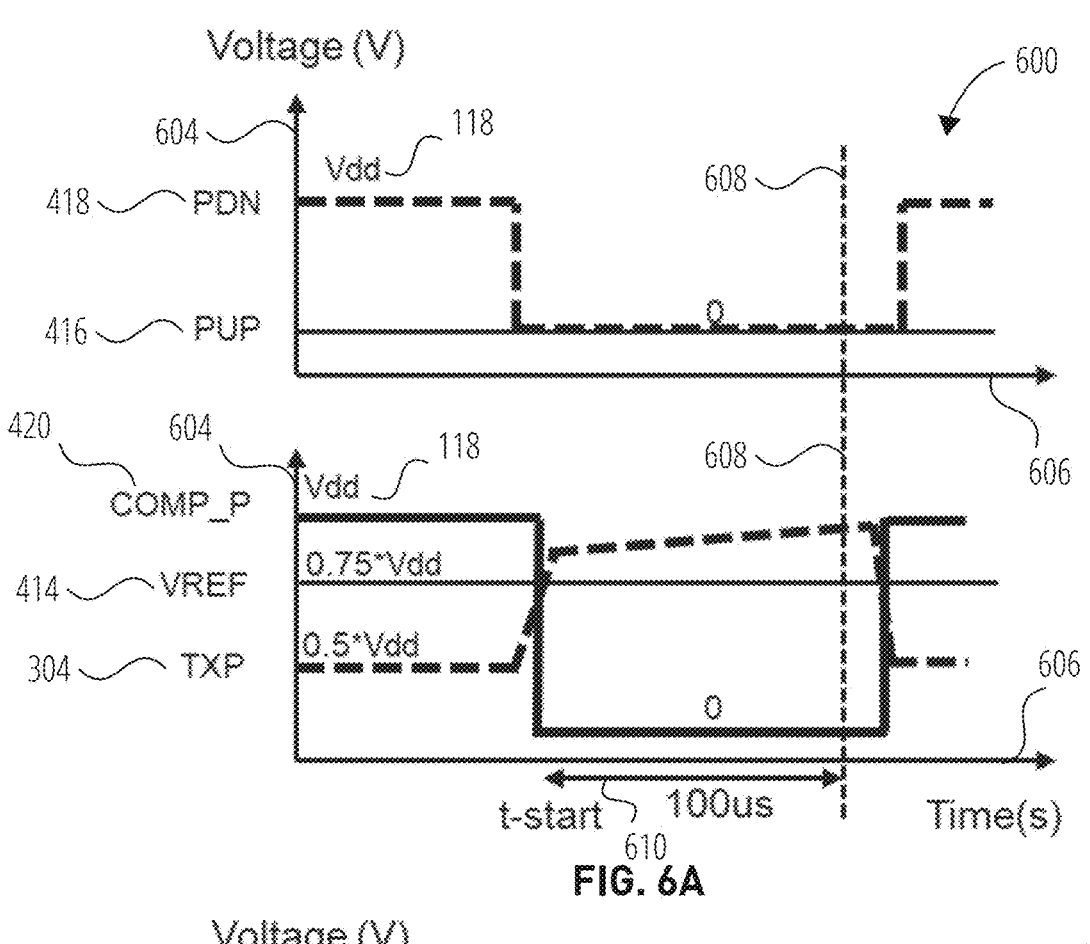
FIG. 6A is a pair of timing diagrams illustrating voltage waveforms during high-impedance termination detection, according to some examples.
Figure 6B:
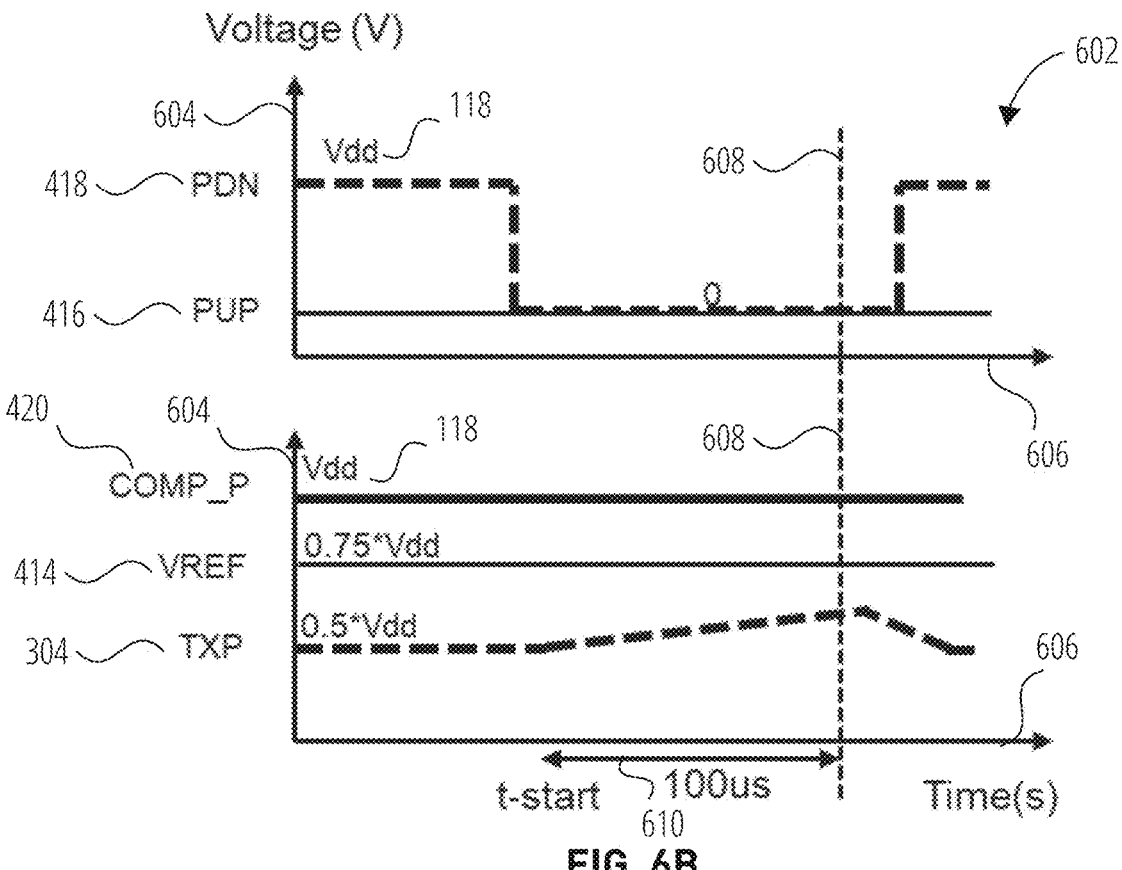
FIG. 6B is a pair of timing diagrams illustrating voltage waveforms during low-impedance valid termination detection, according to some examples.

FIG. 6A and FIG. 6B are timing diagrams illustrating voltage waveforms corresponding to a high-impedance scenario indicating invalid termination (in FIG. 6A) and a low-impedance scenario indicating valid termination detection (in FIG. 6B). The timing diagrams 600 and 602 show voltage waveforms for key signals during receiver termination detection.

The vertical axis represents levels of voltage 604 referenced to a supply voltage (Vdd 118), while the horizontal axis shows time 606 relative to a start time (t-start) and a sample time 608 delayed from the start time by a delay 610.

The pull-down voltage 418 (PDN) signal and pull-up voltage 416 (PUP) signal control the pull-up and pull-down transistors 406 and 408 respectively.

Both scenarios, in timing diagram 600 and timing diagram 602, begin with identical signal levels at time zero. The pull-down voltage 418 PDN (shown by the dashed line) is at Vdd 118 and pull-up voltage 416 PUP (shown by the solid line) is at ground (shown as zero voltage), turning on both transistors to establish an initial common-mode voltage of 0.5*Vdd at the positive transmit node 304 TXP. The positive comparator output 420 COMP_P (shown by the thick solid line) is initially at Vdd because positive transmit node 304 TXP (shown by the dashed line) is below the reference voltage 414 Vref (shown by the thin solid at 0.75*Vdd).

At t-start (sample time 608 minus delay 610), in both timing diagrams 600 and 602, pull-down voltage 418 PDN transitions to ground, and pull-up voltage 416 PUP remains at ground.

Timing diagram 600 in FIG. 6A illustrates a high-impedance scenario corresponding to invalid receiver termination. For a high-impedance termination, such as above 10 kiloohms, positive transmit node 304 TXP charges almost instantaneously at t-start from 0.5*Vdd to approximately 0.75*Vdd as shown by the rise of the dashed line in FIG. 6A. As soon as positive transmit node 304 TXP exceeds reference voltage 414 Vref, the positive comparator output 420 COMP_P drops to ground. The voltage of the positive transmit node 304 TXP then continues charging toward Vdd, based on a time constant determined by the termination resistance and coupling capacitance. In some examples, the time constant is determined by pull-up resistance $R_{PUP}$ of pull-up resistor 410, termination resistance $R_{RX}$ of receiver resistor 114, and AC coupling capacitance $C_{AC}$ of capacitor 112, as $(R_{RX}+R_{PUP})*C_{AC}$.

Timing diagram 602 in FIG. 6B shows an alternative, low-impedance scenario corresponding to valid receiver termination. In timing diagram 602, positive transmit node 304 TXP remains near 0.5*Vdd after t-start due to the presence of valid termination resistance between 40-60 ohms. The voltage of positive transmit node 304 TXP charges to slightly above its initial level, as in timing diagram 600, but does not exceed the reference voltage 414 Vref of 0.75*Vdd. Accordingly, positive comparator output 420 COMP_P remains at Vdd.

After a delay 610, in this case approximately 100 microseconds (us or μs), the positive comparator output 420 (as well as negative comparator output 422, not shown) is sampled at sample time 608 to determine if valid termination is present.

After sample time 608, the pull-down voltage 418 PDN signal transitions back to its initial voltage at Vdd. This marks the end of the termination detection process, and allows the wireline datalink 100 to resume normal operation if valid termination has been detected (as in timing diagram 602). If valid termination is not detected (as in timing diagram 600), the receiver termination detection circuit 302 may indicate a fault and/or repeat the process one or more times to continue testing for valid termination. Until valid termination at the receiver side of the wireline datalink 100 has been detected, the transmitter circuit will not enter a normal operation mode to begin transmitting to the receiver.

Figure 7:
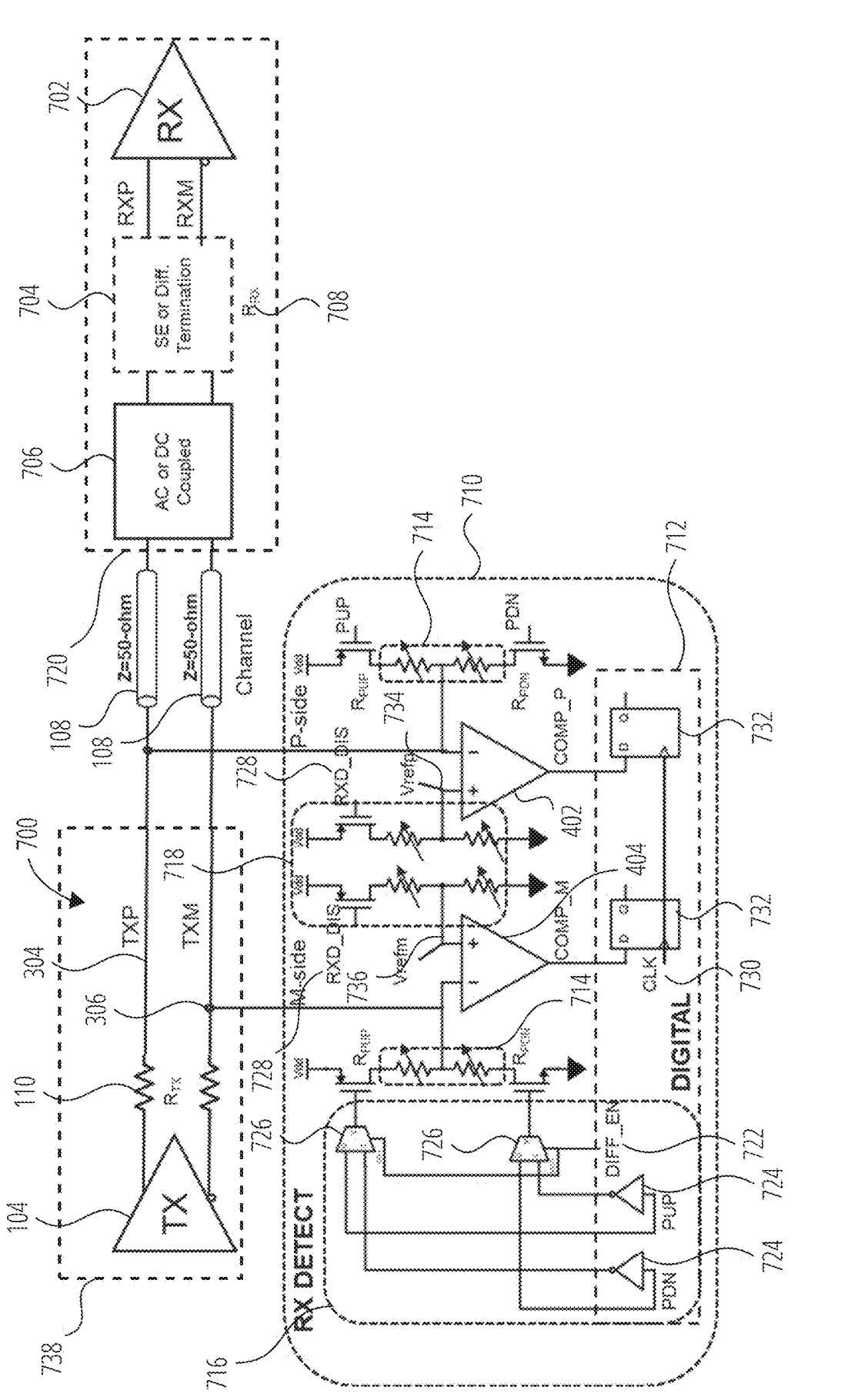
FIG. 7 is a circuit diagram illustrating a dual-mode receiver termination detection circuit supporting both single-ended and differential termination detection, according to some examples.

FIG. 7 is a circuit diagram illustrating a dual-mode transmit circuit 700 of a wireline data link having a dual-mode receiver termination detection circuit 710 supporting both single-ended and differential receiver termination detection. The receiver configuration 720 of the datalink is shown as being arbitrary: having either an AC- or DC-coupled receiver termination coupling mode 706, and having either a single-ended or differential receiver termination resistor configuration 704 of the receiver 702. In some examples, the single-ended termination resistance is between 40-60 ohms, while differential termination resistance is between 80-120 ohms.

Thus, in addition to performing receiver termination detection for single-ended receiver architectures (such as wireline datalink 100 and wireline datalink 102 in FIG. 1A and FIG. 1B), as performed by the receiver termination detection circuit 302 of FIG. 3, the dual-mode transmit circuit 700 can also perform receiver termination detection for differential receiver architectures (such as wireline datalink 200 and wireline datalink 202 in FIG. 2A and FIG. 2B).

This allows the dual-mode transmit circuit 700 to be used as a component in designs or systems supporting multiple protocol standards such as PCIe, USB, Custom Low Power Interfaces, and so on.

The transmitter circuit 738 of the dual-mode transmit circuit 700 includes a series terminated transmit driver 104 with transmit resistors 110 connected to positive transmit node 304 (TXP) and negative transmit node 306 (TXM). The transmit nodes connect through a channel 108 that may be AC or DC coupled to the receiver 702.

The dual-mode receiver termination detection circuit 710 connects to the transmit nodes 306 and 304 and includes the same components as the receiver termination detection circuit 302 shown in FIG. 4. These components are not labelled, for greater visual simplicity, but include the positive comparator 402 and negative comparator 404 coupled to the positive transmit node 304 and negative transmit node 306, respectively.

The pull-up transistor 406 and pull-down transistor 408 of the receiver termination detection circuit 302 are present in the dual-mode receiver termination detection circuit 710, but in the dual-mode receiver termination detection circuit 710 they are coupled to programmable pull-up and pull-down resistors coupled to both transmit nodes (shown as programmable resistors 714).

The voltage comparators in dual-mode receiver termination detection circuit 710 have independent reference voltage inputs instead of a single reference voltage 414 Vref: a positive reference voltage 734 (Vrefp) and negative reference voltage 736 (Vrefm) for comparison to the negative transmit node 306 and positive transmit node 304 voltages.

Digital control logic 712 controls the detection operation based on a mode selection input 722 (DIFF_EN) that selects between single-ended and differential detection modes. The mode selection input 722 can be controlled by a register bit that is pre-set to a value indicating the receiver termination resistor configuration 704 of the datalink when it is designed or configured (e.g., 0 for single-ended, 1 for differential).

The mode selection input 722 is provided to mode selection logic 716 that includes multiplexers 726 and inverters 724 configured to generate appropriate pull-up and pull-down control signals based on the mode selection input 722. Details of the voltage levels of the various signals are described below in reference to FIG. 10 through FIG. 14.

The dual-mode receiver termination detection circuit 710 includes a receiver detection disable signal 728 RX_DIS that controls reference voltage generation by reference generation logic 718. The reference generation logic 718 includes a pair of transistors controlled by the receiver detection disable signal 728, coupled between Vdd and another set of programmable pull-up and pull-down resistors. The programmable pull-up and pull-down resistors set the voltage levels for positive reference voltage 734 Vrefp and negative reference voltage 736 Vrefm.

Within the digital control logic 712, a clock signal 730 drives data flip-flops 732 that sample the comparator outputs after a programmable time delay.

In operation, when in a single-ended detection mode (e.g., receiver detection disable signal 728 RX_DIS=0 and mode selection input 722 DIFF_EN=0), the digital control logic 712 drives negative transmit node 306 and positive transmit node 304 concurrently to the same voltage level. Although not shown in FIG. 7, in some examples, the receiver detection disable signal 728 (RXD_DIS) also gates the PUP and PDN transistors such that the dual-mode receiver termination detection circuit 710 is in a disabled state. In such a scenario, positive transmit node 304 (TXP) and negative transmit node 306 (TXM) are not driven by the dual-mode receiver termination detection circuit 710.

When in a differential detection mode (e.g., receiver detection disable signal 728 RX_DIS=0 and mode selection input 722 DIFF_EN=1), the negative transmit node 306 and positive transmit node 304 are driven to opposite rails operating differentially. In some examples, the programmable time delay is set to approximately 1 microsecond for DC-coupled operation and approximately 100 microseconds for AC-coupled operation. In some examples, the programmable time delay is set to a first duration for DC-coupled operation (such as a value between 0.1 μs and 10 μs), and the programmable time delay is set to a second duration for AC-coupled operation that is at least ten times the first duration (such as between 50 and 500 μs).

The programmable resistors 714 coupled to the negative transmit node 306 and positive transmit node 304 are programmable to adjust the initial common-mode voltage of the transmit nodes and control charging time characteristics during termination detection.

In some examples, after detecting valid termination, the receiver detection disable signal 728 RXD_DIS switches from 0 to 1, causing the digital control logic 712 to transition from detection mode to normal operation mode by enabling the transmitting operations of the dual-mode transmit circuit 700 and disabling the dual-mode receiver termination detection circuit 710 while maintaining common-mode voltage at the transmit nodes 306 and 304.

In some examples, the dual-mode transmit circuit 700 can support both PCIe standard single-ended termination detection and USB standard differential termination detection protocols.

Figure 8:
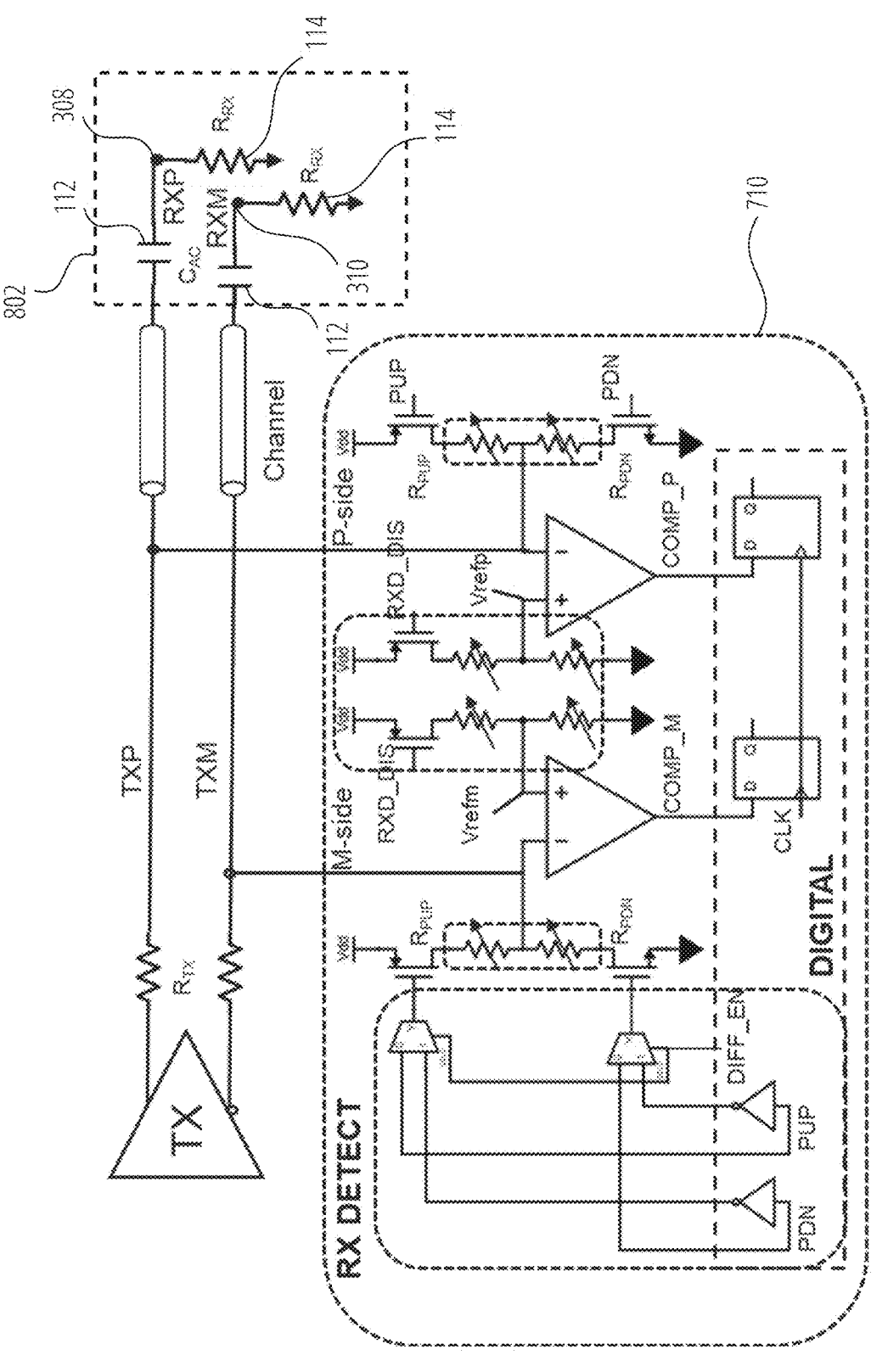
FIG. 8 is a circuit diagram illustrating operation of the dual-mode receiver termination detection circuit of FIG. 7 in single-ended detection mode, according to some examples.

In some examples, the reference voltage inputs positive reference voltage 734 and negative reference voltage 736 are set to approximately 0.75 times the supply voltage Vdd for single-ended detection mode. This allows the dual-mode receiver termination detection circuit 710 to perform single-ended detection according to the timing diagram 600 and timing diagram 602 shown in FIG. 6A and FIG. 6B. An example configuration of a datalink using the dual-mode transmit circuit 700 in single-ended detection mode is shown in FIG. 8. In some examples, the programmable resistors 714 coupled to the positive transmit node 304 and/or negative transmit node 306 are each programmed to an impedance of approximately 10 kiloohms or another high value relative to the impedance value of valid receiver termination.

Figure 9:
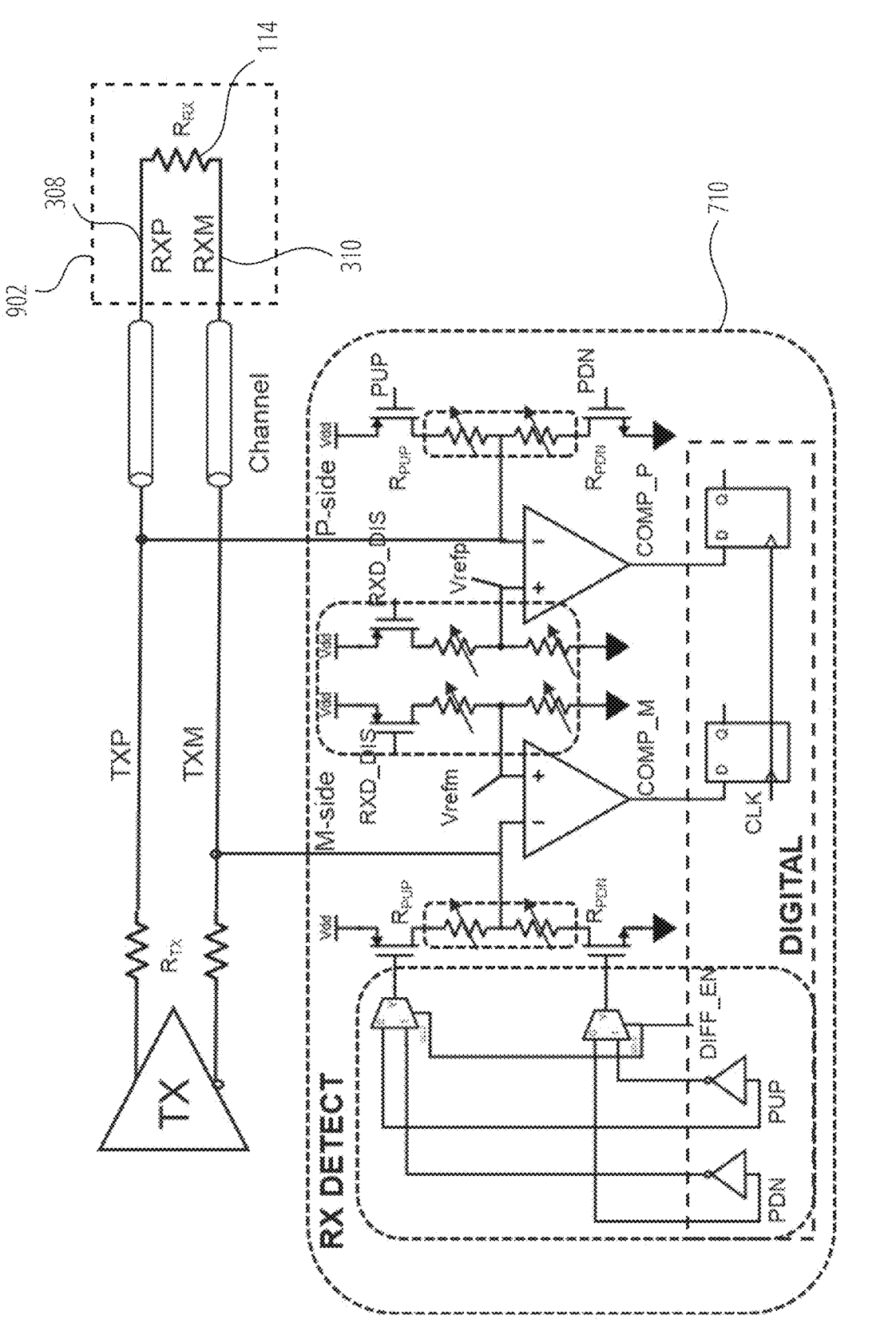
FIG. 9 is a circuit diagram illustrating operation of the dual-mode receiver termination detection circuit of FIG. 7 in differential detection mode, according to some examples.

In differential detection mode, the positive reference voltage 734 can be set to approximately 0.625 times supply voltage Vdd and the negative reference voltage 736 to approximately 0.375 times supply voltage Vdd. The operation of the dual-mode receiver termination detection circuit 710 in differential detection mode is described with reference to FIG. 10 below. An example configuration of a datalink using the dual-mode transmit circuit 700 in differential detection mode is shown in FIG. 9. In some examples, the programmable resistors 714 coupled to the positive transmit node 304 and/or negative transmit node 306 are each programmed to an impedance of approximately 10 kiloohms or another high value relative to the impedance value of valid receiver termination.

FIG. 8 is a circuit diagram illustrating a configuration of a datalink using the dual-mode transmit circuit 700 in single-ended detection mode. The datalink includes a dual-mode transmit circuit 700 having a dual-mode receiver termination detection circuit 710 as shown in FIG. 7. The receiver has a single-ended receiver configuration 802, with capacitors 112 coupling the channels to the negative receive node 310 and positive receive node 308, and receiver resistors 114 used for single-ended termination.

In this configuration, the dual-mode receiver termination detection circuit 710 is set to operate in single-ended detection mode by setting the value of the mode selection input 722 DIFF_EN to a first value, such as zero, corresponding to single-ended operation. This means that the dual-mode receiver termination detection circuit 710 will operate in single-ended detection mode when the receiver detection disable signal 728 RXD_DIS is set to 0.

FIG. 9 is a circuit diagram illustrating a configuration of a datalink using the dual-mode transmit circuit 700 in differential detection mode. The datalink includes a dual-mode transmit circuit 700 having a dual-mode receiver termination detection circuit 710 as shown in FIG. 7. The receiver has a differential receiver configuration 902, with a receiver resistor 114 used for differential termination between the negative receive node 310 and positive receive node 308.

In this configuration, the dual-mode receiver termination detection circuit 710 is set to operate in differential detection mode by setting the value of the mode selection input 722 DIFF_EN to a second value, such as one, corresponding to differential operation. This means that the dual-mode receiver termination detection circuit 710 will operate in differential detection mode when the receiver detection disable signal 728 RXD_DIS is set to 0.

Figure 10:
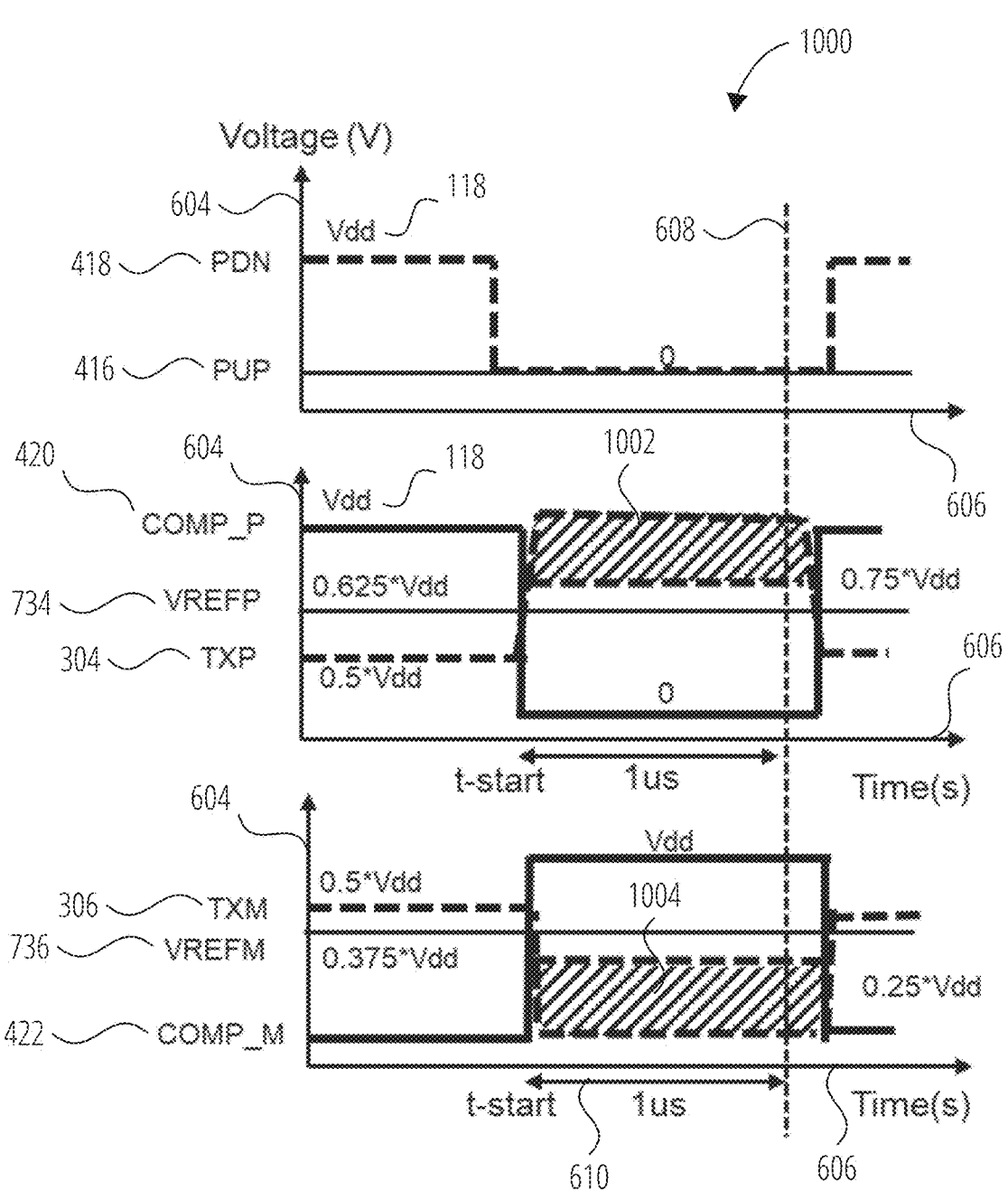
FIG. 10 is a timing diagram illustrating voltage waveforms during high-impedance detection by the dual-mode receiver termination detection circuit in the differential detection mode of FIG. 8, according to some examples.

FIG. 10 is a timing diagram 1000 illustrating voltage waveforms during detection of invalid, high-impedance receiver termination by the dual-mode receiver termination detection circuit 710 in differential detection mode. This scenario corresponds to the datalink of FIG. 9 without a receiver present or with receiver termination otherwise improperly configured. It will be appreciated that the dual-mode receiver termination detection circuit 710 operates as described above for single-ended AC-coupled links, in which the two positive reference voltages (positive reference voltage 734 and negative reference voltage 736) are the same, and the voltages on the positive transmit node 304 and negative transmit node 306 operate in a common-mode fashion.

The timing diagram 1000 shows the pull-down voltage 418 (PDN), pull-up voltage 416 (PUP), positive comparator output 420 (COMP_P), positive reference voltage 734 (VREFP), positive transmit node 304 (TXP), negative transmit node 306 (TXM), negative reference voltage 736 (VREFM), and negative comparator output 422 (COMP_M) signals graphed as voltage 604 against time 606.

At the start of operation, pull-down voltage 418 (dashed line) is at Vdd and pull-up voltage 416 is at ground, initializing both the negative transmit node 306 and positive transmit node 304 to 0.5*Vdd. The positive reference voltage 734 is set to 0.625*Vdd while the negative reference voltage 736 is set to 0.375*Vdd.

At time t-start, pull-down voltage 418 transitions to ground while pull-up voltage 416 remains at ground.

For a high-impedance termination condition, e.g., exceeding 10 kiloohms, positive transmit node 304 voltage rises above 0.625*Vdd into a TXP shaded region 1002 between 0.75*Vdd and 1*Vdd, while negative transmit node 306 voltage falls below 0.375*Vdd into a TXM shaded region 1004 between 0.25*Vdd and 0*Vdd.

After a programmable delay 610, shown here as 1 microsecond for DC-coupled operation, the positive comparator output 420 and negative comparator output 422 are sampled at sample time 608. Positive comparator output 420 transitions from logic 1 to logic 0 when positive transmit node 304 voltage exceeds positive reference voltage 734, while negative comparator output 422 transitions from logic 0 to logic 1 when negative transmit node 306 falls below negative reference voltage 736. This complementary comparator output pattern indicates invalid high-impedance termination in differential detection mode.

The timing diagram 1000 illustrates how the dual-mode receiver termination detection circuit 710 detects high-impedance termination by driving the transmit nodes differentially and comparing their voltages against offset reference levels. The 1 microsecond delay 610 allows sufficient time for the voltages to settle before sampling the comparator outputs.

Figure 11:
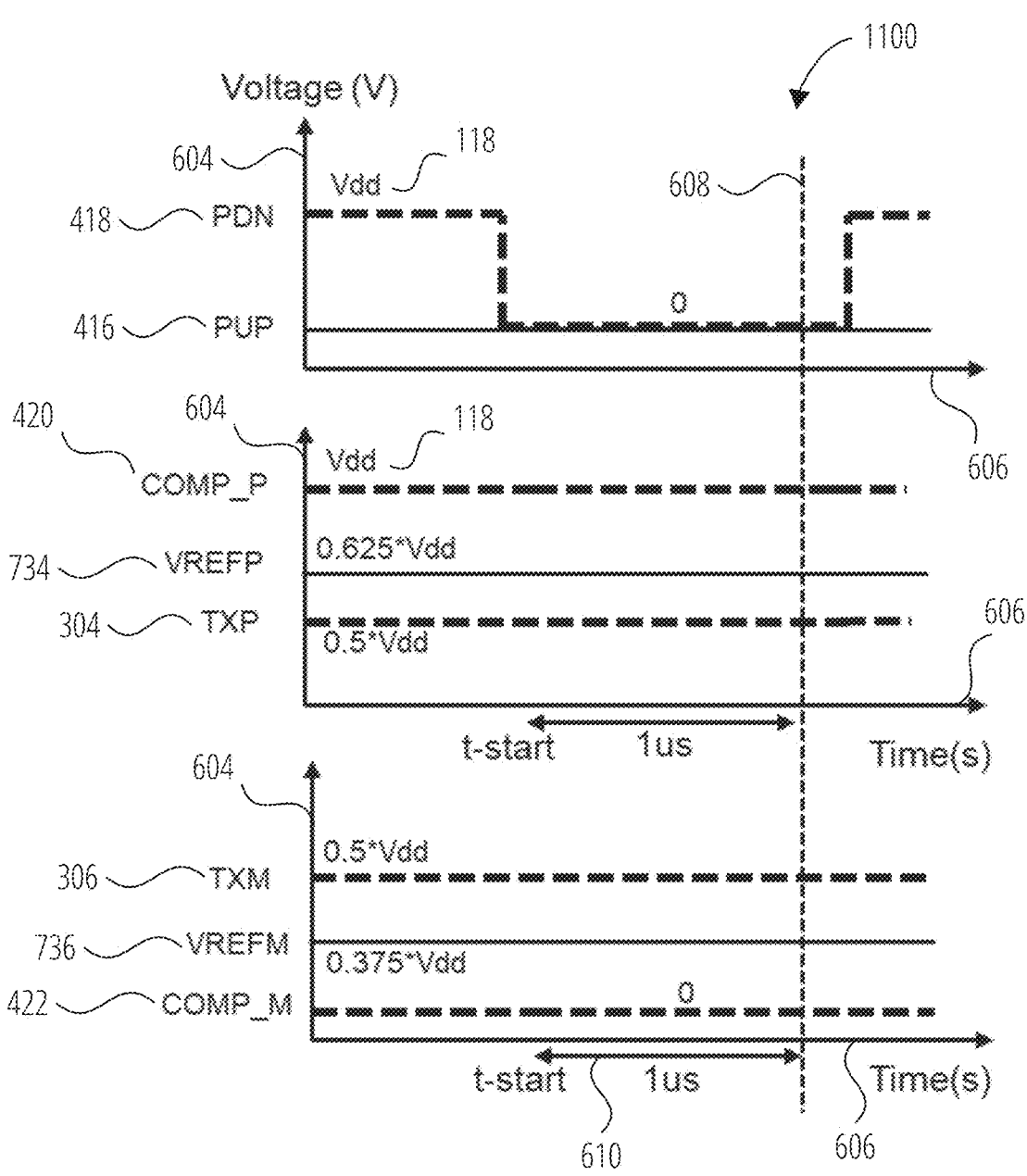
FIG. 11 is a timing diagram illustrating voltage waveforms during valid termination detection by the dual-mode receiver termination detection circuit in the differential detection mode of FIG. 8, according to some examples.

FIG. 11 is a timing diagram illustrating voltage waveforms during valid termination detection by the dual-mode receiver termination detection circuit in the differential detection mode.

FIG. 11 is a timing diagram 1100 illustrating voltage waveforms during detection of valid, relatively low-impedance receiver termination by the dual-mode receiver termination detection circuit 710 in differential detection mode. This scenario corresponds to the datalink of FIG. 9 with a validly-configured receiver present.

The timing diagram 1100 shows the pull-down voltage 418 (PDN), pull-up voltage 416 (PUP), positive comparator output 420 (COMP_P), positive reference voltage 734 (VREFP), positive transmit node 304 (TXP), negative transmit node 306 (TXM), negative reference voltage 736 (VREFM), and negative comparator output 422 (COMP_M) signals graphed as voltage 604 against time 606.

At the start of operation, as in timing diagram 1000 in FIG. 10, pull-down voltage 418 (dashed line) is at Vdd and pull-up voltage 416 is at ground, initializing both the negative transmit node 306 and positive transmit node 304 to 0.5*Vdd. The positive reference voltage 734 is set to 0.625*Vdd while the negative reference voltage 736 is set to 0.375*Vdd.

At time t-start, pull-down voltage 418 transitions to ground while pull-up voltage 416 remains at ground.

For a valid differential termination condition, such as between 80-120 ohms, negative transmit node 306 and positive transmit node 304 voltages remain at approximately 0.5*Vdd, and the positive comparator output 420 remains at Vdd, due to the low value of RX termination of receiver resistor 114 (e.g., $R_{RX}$=50 ohms) compared to the pull-up resistor 410 $R_{PUP}$ and pull-down resistor 412 $R_{PDN}$.

After a programmable delay 610, shown here as 1 microsecond for DC-coupled operation, the positive comparator output 420 and negative comparator output 422 are sampled at sample time 608. Positive comparator output 420 maintains logic 1 because positive transmit node 304 remains below positive reference voltage 734, while negative comparator output 422 maintains logic 0 because negative transmit node 306 remains above negative reference voltage 736. This complementary comparator output pattern indicates valid differential termination.

The timing diagram 1100 illustrates how the dual-mode receiver termination detection circuit 710 detects valid differential termination by maintaining the transmit nodes at their initial common-mode voltage when properly terminated. The 1 microsecond delay 610 allows sufficient time for the voltages to settle before sampling the comparator outputs.

After detecting valid termination, the dual-mode transmit circuit 700 can transition to normal operation while maintaining the common-mode voltage at the positive transmit node 304 and negative transmit node 306. The transmit circuit is enabled, and then receiver detection is disabled (e.g., the receiver detection disable signal 728 RXD_DIS is set to 1), to maintain the common-mode voltage. Once common-mode is established, data is driven through the series terminated transmit driver 104.

Thus, the dual-mode receiver termination detection circuit 710 is capable of operating to identify valid receiver termination for either AC-coupled receivers with single-ended termination (as shown in FIG. 8, with signal behaviors shown in FIG. 6A and FIG. 6B) or DC-coupled receivers with differential termination (as shown in FIG. 9, with signal behaviors shown in FIG. 10 and FIG. 11). Furthermore, in some examples, the dual-mode receiver termination detection circuit 710 may be configurable to also identify valid receiver termination for alternative receiver and datalink architectures, such as DC-coupled receivers with single-ended termination and/or AC-coupled receivers with differential termination. FIG. 12A through FIG. 14 provide examples of how the dual-mode receiver termination detection circuit 710 could be operated to perform termination detection for such alternative receiver architectures.

Figure 12A:
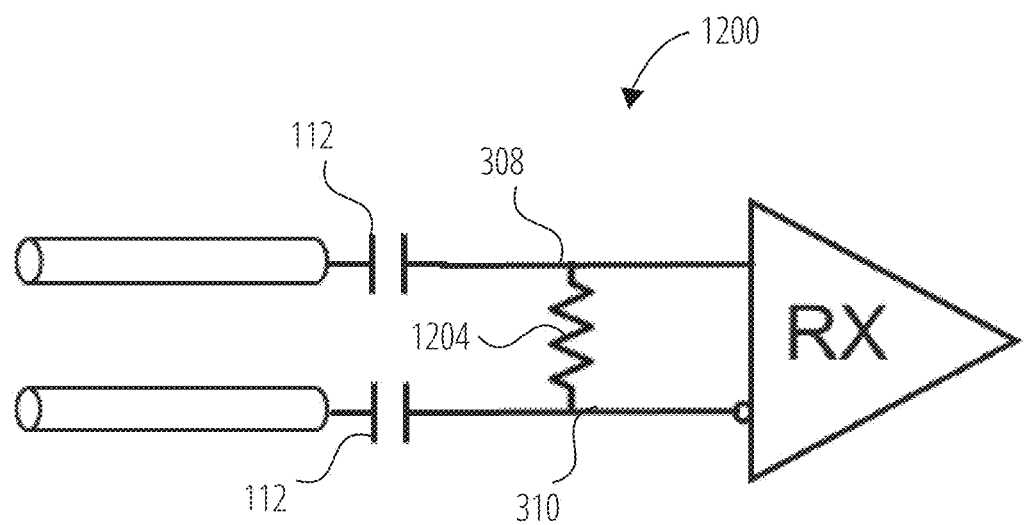
FIG. 12A is a circuit diagram illustrating an AC coupled receiver with differential receiver termination, according to some examples.

FIG. 12A is a circuit diagram illustrating an AC coupled receiver 1200 with differential receiver termination. The AC coupled receiver 1200 includes AC coupling capacitors 112, like the receiver in the wireline datalink 100 or wireline datalink 102, but uses a single differential termination resistor 1204 (or multiple resistors in series) coupled between the positive receive node 308 and negative receive node 310 for termination, like the receivers of wireline datalink 200 or wireline datalink 202.

When configured to identify receiver termination in conjunction with a datalink using the AC coupled receiver 1200 shown in FIG. 12A, the dual-mode receiver termination detection circuit 710 can be configured to operate in differential detection mode, as described above. However, unlike in the scenarios of FIG. 10 and FIG. 11, the programmable delay 610 is set to the longer duration (e.g., 100 µs) due to the use of AC coupling. Otherwise, the signal voltages in valid (e.g., low impedance) and invalid (e.g., high impedance) scenarios using the AC coupled receiver 1200 may be determined by the positive reference voltage 734 and negative reference voltage 736, which may be set such that valid and invalid cases are detected with sufficient margin to make decision. The common-mode voltage during receiver termination detection may or may not match the common-mode voltage observed during normal operating mode.

Figure 12B:
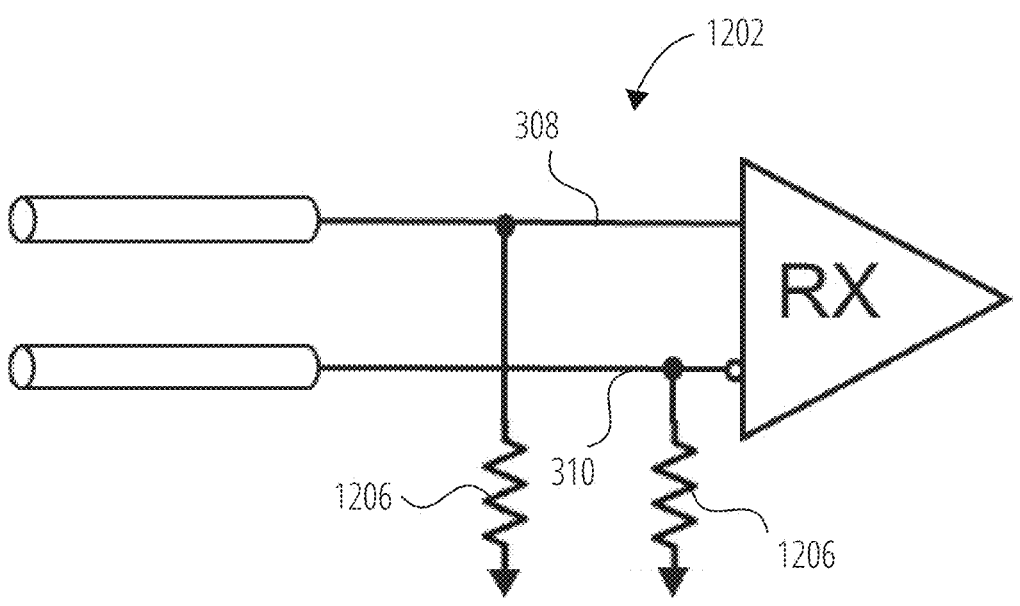
FIG. 12B is a circuit diagram illustrating a DC coupled receiver with single-ended receiver termination, according to some examples.

FIG. 12B is a circuit diagram illustrating a DC coupled receiver 1202 with single-ended receiver termination. The DC coupled receiver 1202 has no capacitors, like the receivers of wireline datalink 200 or wireline datalink 202. However, like the receiver in the wireline datalink 100 or wireline datalink 102, the DC coupled receiver 1202 uses a pair of single-ended termination resistors 1206 coupled to the positive receive node 308 and negative receive node 310, respectively, for termination.

When configured to identify receiver termination in conjunction with a datalink using the DC coupled receiver 1202 shown in FIG. 12B, the dual-mode receiver termination detection circuit 710 can be configured to operate in single-ended detection mode, as described above. However, unlike in the scenarios of FIG. 6A and FIG. 6B, the programmable delay 610 is set to the shorter duration (e.g., 1 µs) due to the use of DC coupling.

Figure 13:
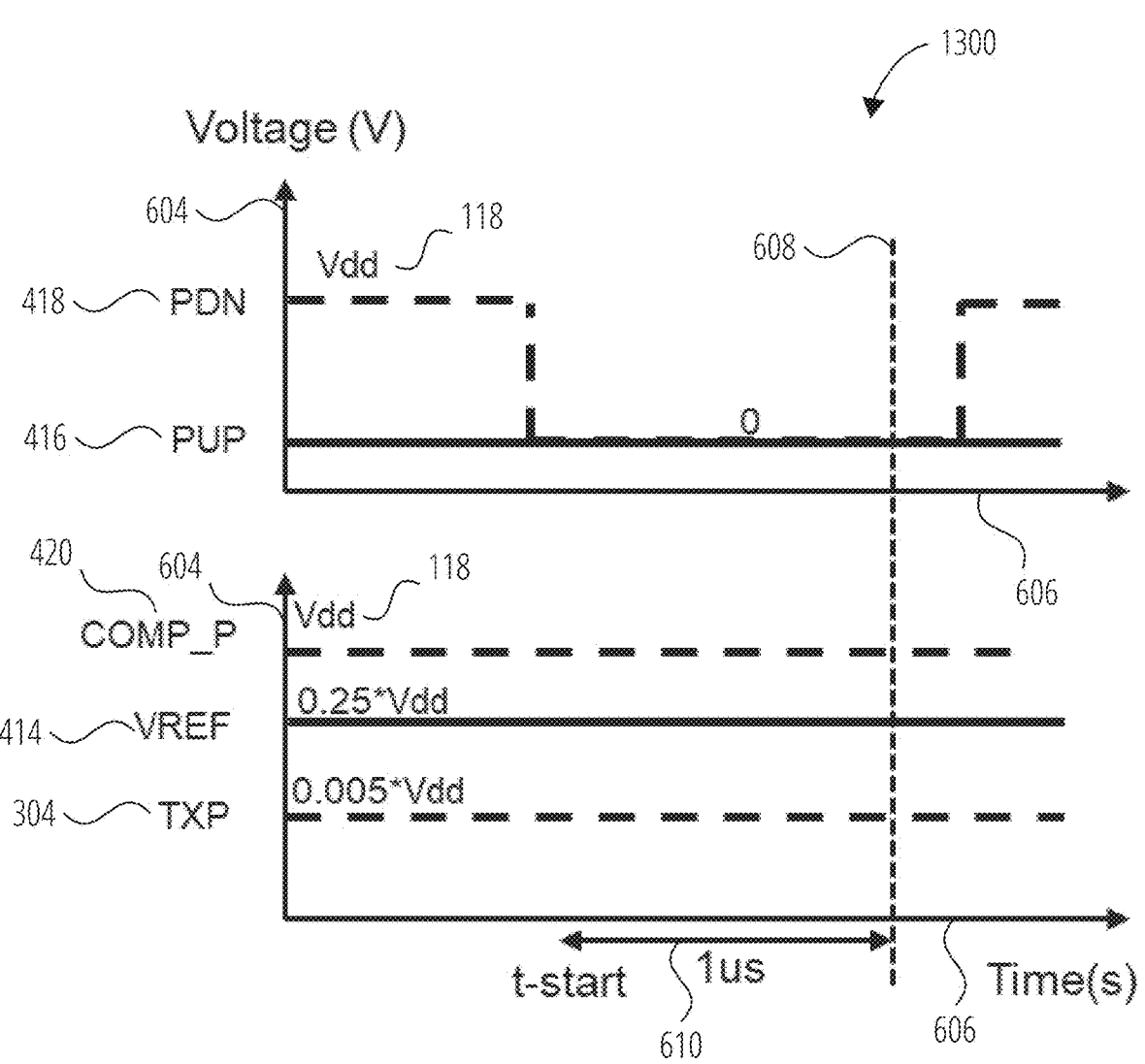
FIG. 13 is a timing diagram illustrating voltage waveforms during valid termination detection by the dual-mode receiver termination detection circuit in a DC-coupled single-ended detection mode, according to some examples.
Figure 14:
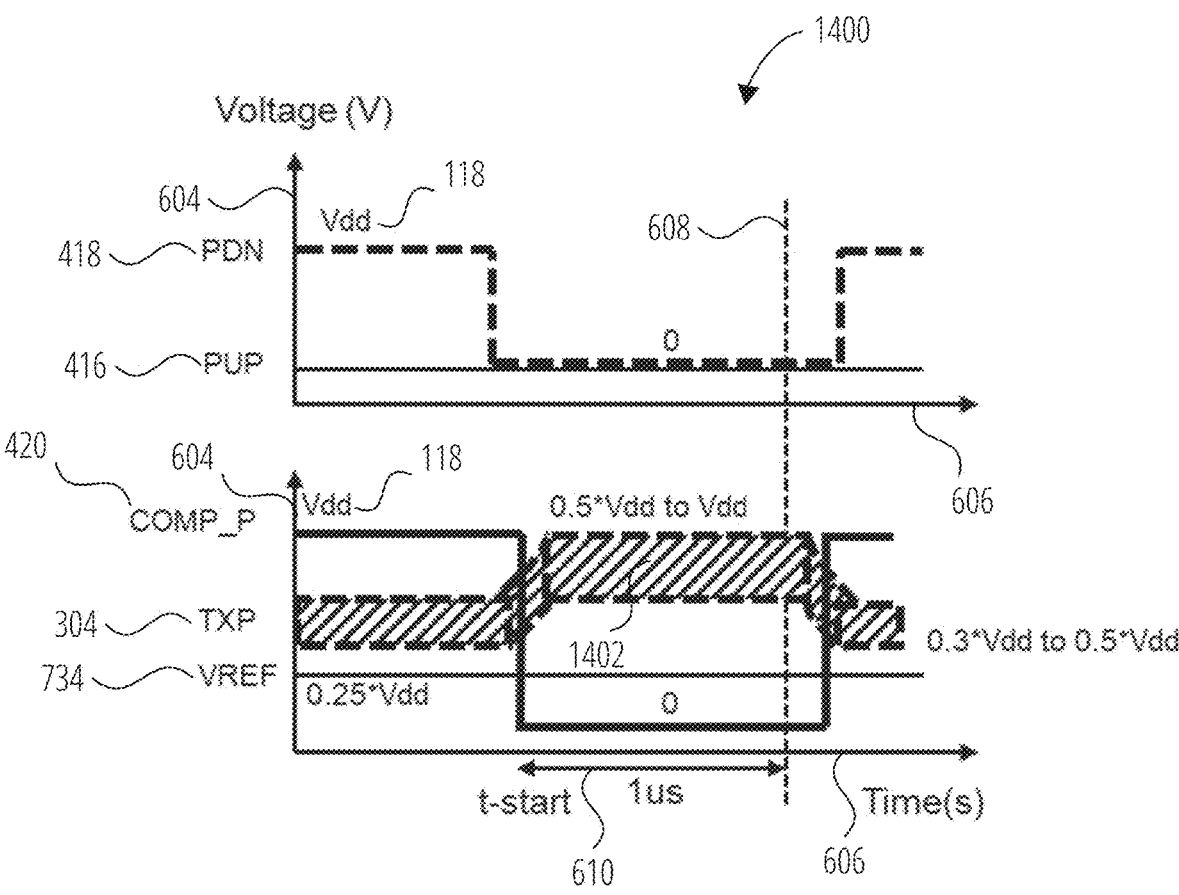
FIG. 14 is a timing diagram illustrating voltage waveforms during high-impedance detection by the dual-mode receiver termination detection circuit in a DC-coupled single-ended detection mode, according to some examples.

In the low-impedance, valid-termination scenario using the DC coupled receiver 1202, the signal voltages of the dual-mode receiver termination detection circuit 710 may be as shown in FIG. 13. In the high-impedance, invalid-termination scenario using the DC coupled receiver 1202, the signal voltages of the dual-mode receiver termination detection circuit 710 may be as shown in FIG. 14.

FIG. 13 is a timing diagram illustrating voltage waveforms during valid termination detection by the dual-mode receiver termination detection circuit 710 in a DC-coupled single-ended detection mode, such as using the DC coupled receiver 1202 of FIG. 12B.

The timing diagram 1300 depicts voltage waveforms for multiple signals during valid termination detection operation. The timing diagram shows pull-down voltage 418 (PDN), pull-up voltage 416 (PUP), positive comparator output 420 (COMP_P), reference voltage 414 (VREF), and positive transmit node 304 (TXP) signals plotted as voltage 604 against time 606 with reference to a supply voltage (Vdd) 118. It will be appreciated that only the voltages of the positive portion of the circuit are shown in timing diagram 1300, with reference voltage 414 (VREF) indicating positive reference voltage 734 (VREFP)—the negative portion of the circuit coupled to the negative transmit node 306 (TXM) behaves similarly, with reference voltage 414 (VREF) standing in for the negative reference voltage 736 (VREFM).

At the start of operation at the left end of the timing diagram 1300, pull-down voltage 418 is at Vdd 118 and pull-up voltage 416 is at ground (zero voltage), initializing the transmit nodes 304 and 306 to their common-mode voltage. The reference voltage 414 (VREF) is set to 0.25*Vdd using the programmable resistor divider. In some examples, the pull-up resistors 410 and pull-down resistors 412 are programmable to adjust the initial common-mode voltage and control charging time characteristics.

At time t-start, pull-down voltage 418 transitions to ground, while pull-up voltage 416 remains at ground. For a valid single-ended termination (e.g., between 40-60 ohms in some examples), positive transmit node 304 voltage stays at approximately 0.005*Vdd due to the pull-up resistance $(R_{PUP})$ being much higher than the receiver termination resistance 708 $(R_{RX})$.

After a programmable delay 610 (shown as 1 microsecond in this example) for DC-coupled operation, the comparator outputs 420 and 422 are sampled at sample time 608. Positive comparator output 420 (COMP_P) maintains voltage Vdd 118 because the positive transmit node 304 (TXP) remains below reference voltage 414 (VREF), indicating valid termination. The shorter (e.g., 1 microsecond) delay 610, compared to the example delay of 100 microseconds for AC-coupled operation, can enable faster link initialization for DC-coupled links.

The timing diagram 1300 illustrates how the dual-mode receiver termination detection circuit 710 detects valid single-ended termination in DC-coupled mode by maintaining the transmit node voltage below the reference threshold when properly terminated.

After detecting valid termination, the circuit can transition to normal operation by enabling the transmitter circuit 738 and disabling termination detection while maintaining the common-mode voltage at the output nodes.

FIG. 14 is a timing diagram 1400 illustrating example voltage waveforms during high-impedance detection by the dual-mode receiver termination detection circuit 710 in a DC-coupled single-ended detection mode, such as using the DC coupled receiver 1202 of FIG. 12B.

In some examples, the programmable resistors 714 of the dual-mode receiver termination detection circuit 710 coupled to the positive transmit node 304 and/or negative transmit node 306 are each programmed to multiple different impedance values when using a DC coupled receiver 1202 with single-ended receiver termination. In some examples, the pull-up resistor of each pair of programmable resistors 714 is set to approximately 10 kiloohms, and the pull-down resistor of each pair can be set to a similar impedance value, such as approximately 10 kiloohms.

The timing diagram 1400 shows pull-down voltage 418 (PDN), pull-up voltage 416 (PUP), positive comparator output 420 (COMP_P), positive transmit node 304 (TXP), and positive reference voltage 734 (VREF) signals. The voltage waveforms are plotted as voltage 604 against time 606. In the illustrated example, only the voltage levels for the signals of the positive side of the dual-mode receiver termination detection circuit 710 are shown, such as positive transmit node 304 voltage instead of the negative transmit node 306 voltage.

At the start of operation, pull-down voltage 418 is at Vdd and pull-up voltage 416 is at ground, initializing the transmit nodes 304 and 306 to their common-mode voltage. The reference voltage VREF (in this case, positive reference voltage 734 Vrefp) is set to 0.25*Vdd using a programmable resistor divider.

At time t-start, pull-down voltage 418 transitions from Vdd 118 to ground, while pull-up voltage 416 remains at ground. For high-impedance receiver termination resistance 708 ($R_{RX}$), such as in excess of 10 kiloohms, positive transmit node 304 (TXP) voltage varies within a TXP shaded region 1402 between 0.5*Vdd and Vdd 118, while transitioning through voltage ranges of 0.3*Vdd to 0.5*Vdd. The voltage variation occurs because in the presence of high-impedance termination, the positive transmit node 304 voltage rises significantly above the 0.25 Vdd reference level. After a programmable delay (shown in this example as 1 microsecond due to DC coupling not requiring capacitor charging time), the comparator outputs (such as are the positive comparator output 420 shown in FIG. 14) are sampled at sample time 608. The shorter (e.g., 1 microsecond) delay 610, compared to the example 100 microseconds delay used for AC-coupled operation, can enable faster link initialization for DC-coupled links. The comparator output indicates invalid termination after sampling, causing the detection process to repeat until valid termination is detected.

The timing diagram 1400 illustrates how the dual-mode receiver termination detection circuit 710 detects high-impedance termination in DC-coupled differential mode by monitoring voltage transitions through specific ranges relative to the supply voltage.

It will be appreciated that, throughout these examples, voltage ranges and timing parameters are programmable to accommodate different system requirements while maintaining reliable detection of valid versus high-impedance termination.

Figure 15:
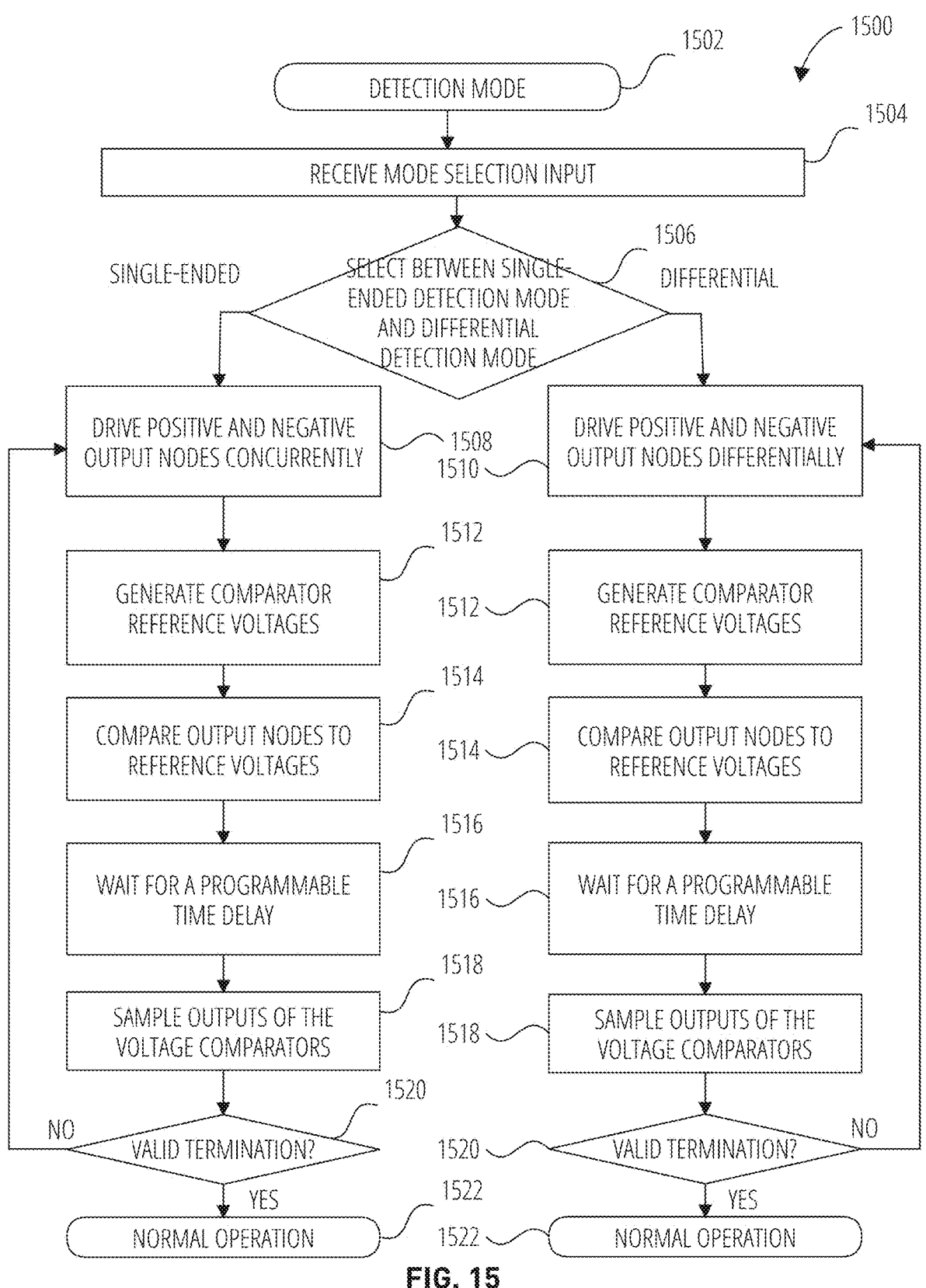
FIG. 15 is a flowchart illustrating a method for detecting receiver termination of a wireline datalink, according to some examples.

FIG. 15 illustrates an example method 1500 for detecting receiver termination of a wireline datalink. Whereas the method 1500 is described with reference to the various circuits described herein, it will be appreciated that some examples may implement method 1500 using different configurations of circuits and sub-circuits.

Although the example method 1500 depicts a particular sequence of operations, the sequence may be altered without departing from the scope of the present disclosure. For example, some of the operations depicted may be performed in parallel or in a different sequence that does not materially affect the function of the method 1500. In other examples, different components of an example device or system that implements the method 1500 may perform functions at substantially the same time or in a specific sequence.

The method 1500 begins at operation 1502 by entering a detection mode. In some examples, entering the detection mode from another mode (such as a startup mode or a normal operation mode) involves setting the value of the receiver detection disable signal 728 to disable the transmitter and initiate receiver termination detection. In some examples, the onset of detection mode at operation 1502 may correspond to time t-start in the various timing diagrams described herein.

At operation 1504, the dual-mode receiver termination detection circuit 710 receives a mode selection input 722 to select between single-ended and differential detection modes. As described above, the mode selection input 722 may be provided by the digital control logic 712 to the mode selection logic 716 using a register bit to generate input signal DIFF_EN.

At operation 1506, the flow of the method 1500 is routed to either operation 1508 if the mode selection input 722 indicates single-ended detection mode, or operation 1510 if the mode selection input 722 indicates differential detection mode.

In single-ended detection, the method 1500 drives the positive transmit node 304 and negative transmit node 306 concurrently at operation 1508. First, the positive transmit node 304 and negative transmit node 306 are pre-charged to a stable common-mode voltage. The charging time used to perform this charging is pre-programmed or otherwise pre-determined to be higher for AC-coupled datalinks and lower for DC-coupled datalinks, because no coupling capacitors are involved in DC-coupled datalinks. After the positive transmit node 304 and negative transmit node 306 are charged to the common-mode voltage, the voltages of the positive transmit node 304 and negative transmit node 306 can be driven to the values shown in timing diagram 600 or timing diagram 602 of FIG. 6A or FIG. 6B, depending on the termination impedance. In some examples, both nodes are driven to the same voltage level of approximately 0.5*Vdd. Because both nodes are terminated independently on the receiver side (at positive receive node 308 and negative receive node 310, each coupled to ground via a respective receiver resistor 114), both nodes can be driven simultaneously and independently, as described above with reference to single-ended detection mode.

In differential detection, the method 1500 drives the positive transmit node 304 and negative transmit node 306 differentially at operation 1510. First, the positive transmit node 304 and negative transmit node 306 are pre-charged to a stable common-mode voltage, as described above with reference to operation 1508. After the positive transmit node 304 and negative transmit node 306 are charged to the common-mode voltage, the voltages of the positive transmit node 304 and negative transmit node 306 can be driven to the values shown in FIG. 10 or FIG. 11, depending on the termination impedance.

After operation 1508 or operation 1510, each detection mode performs similar operations, although the signal values used may differ, as described below.

At operation 1512, the reference generation logic 718 generates offset comparator voltages. In single-ended detection mode, the positive reference voltage 734 and negative reference voltage 736 are both set to approximately 0.75*Vdd. In differential detection mode, the positive reference voltage 734 is set to approximately 0.625*Vdd and the negative reference voltage 736 is set to approximately 0.375*Vdd.

In both modes, at operation 1514, the comparators (positive comparator 402 and negative comparator 404) are used to compare output node voltages (304 and 306) to their respective reference voltages (734 and 736) using voltage comparators.

In both modes, at operation 1516, the digital control logic 712 then waits for a programmable time delay 610 using a clock signal 730 driving data flip-flops 732. In some examples, the delay 610 is approximately 1 microsecond for DC-coupled operation and approximately 100 microseconds for AC-coupled operation.

After the delay 610 has passed, at sample time 608, the comparator outputs (positive comparator output 420 and negative comparator output 422) are sampled.

At operation 1520, the dual-mode receiver termination detection circuit 710 evaluates whether valid termination is detected based on the sampled comparator outputs. In single-ended detection mode, valid termination can be detected when both comparator outputs are at a high logic level, which indicates that the termination resistance is at a valid level (e.g., between approximately 40-60 ohms). In differential mode, valid termination can be detected when the positive comparator output 420 is at a high logic level and negative comparator output 422 is at a low logic level, indicating that the termination resistance is at a valid level (e.g., between approximately 80-120 ohms).

If valid termination is detected at operation 1520, the method 1500 transitions to normal operation 1522 by enabling the transmitter circuit and disabling the dual-mode receiver termination detection circuit 710 while maintaining common-mode voltage at the positive transmit node 304 and negative transmit node 306.

If invalid termination is detected at operation 1520, the method 1500 loops back to operation 1508 or operation 1510, as appropriate, to repeat the termination detection process, beginning with charging the positive transmit node 304 and negative transmit node 306 to the common-mode voltage, as described above with reference to operation 1508 and operation 1510.

Examples described herein refer to the positive of plus (P) node or portion of the circuit as the portion being pulled up to a higher voltage, and the negative or minus (N or M) node or portion as of the circuit as the portion being pulled down to a lower voltage. It will be appreciated that, in some cases, the roles played by the positive and negative portions of the circuit can be reversed by sampling the outputs of the comparators differently.

Some examples described herein can support standards such as PCI and USB. It will be appreciated that the USB standard has multiple versions: some use DC coupled differential termination (e.g., eUSB), some use DC coupled single-ended termination (e.g., USB 1.0 and USB 2.0), and others use AC coupled single-ended termination (e.g., USB 3.0 and later). Receiver termination detection is generally required by the standard in AC coupled single-ended USB architectures. Others do not generally mandate a specific mechanism for termination detection, and the system designers may or may not need receiver termination detection. In addition to supporting PCI standards, some examples described herein can support some or all of the USB link architectures listed above, and/or other systems requiring a termination detection circuit.

An example machine architecture will now be described, providing examples suitable for implementing one or more of the operations of the method 1500 described above as instructions executed by one or more processors of a system, such as the machine described with reference to FIG. 16. In some examples, one or more of the signals or controls described above can be generated, and/or one or more of the samples or determinations can be performed, by firmware or other software instructions executed by a machine, as described below.

Figure 16:
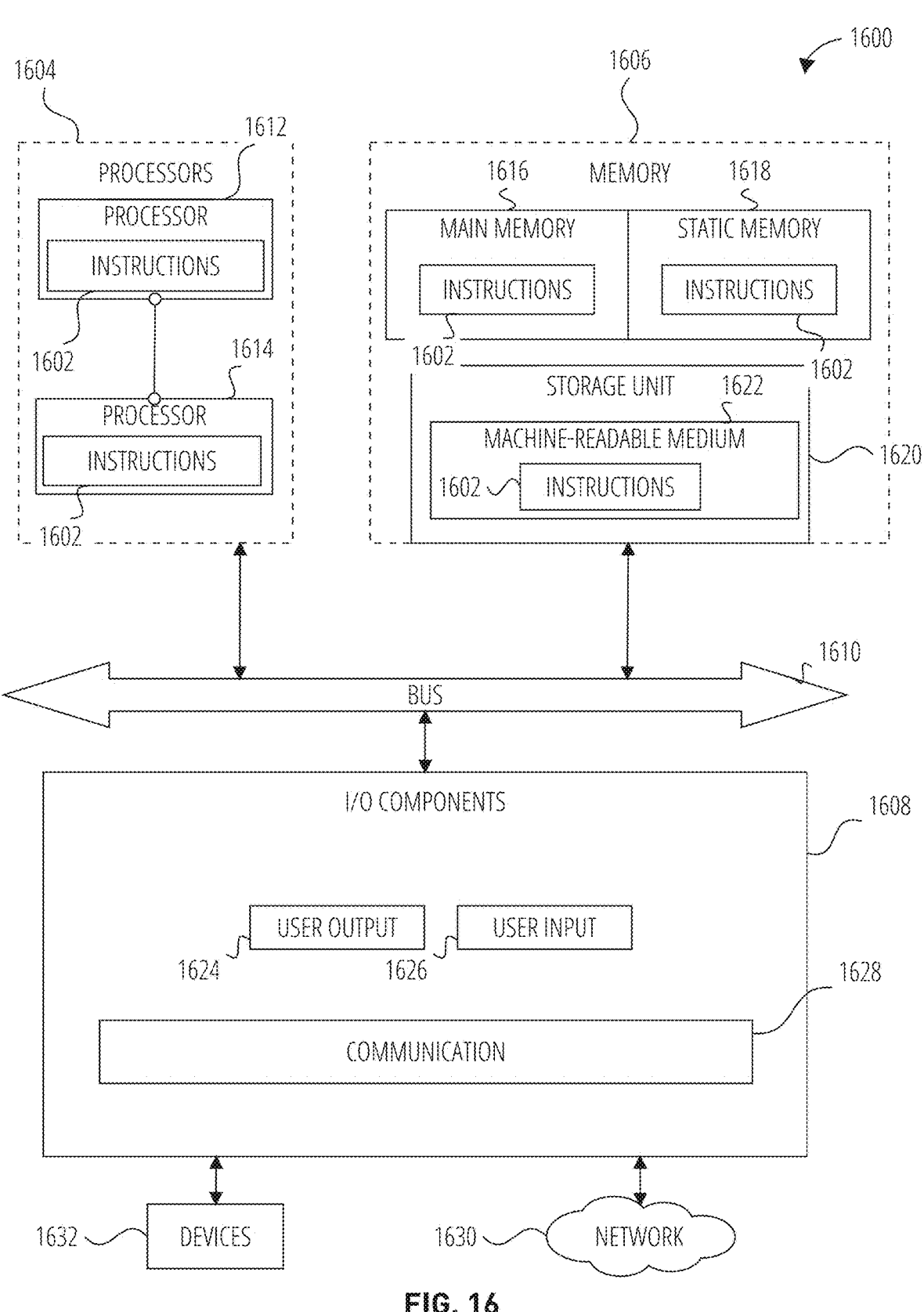
FIG. 16 is a diagrammatic representation of a machine in the form of a computer system within which a set of instructions may be executed to cause the machine to perform any one or more of the methodologies discussed herein, according to some examples.

FIG. 16 is a diagrammatic representation of the machine 1600 within which instructions 1602 (e.g., software, a program, an application, an applet, an app, or other executable code) for causing the machine 1600 to perform any one or more of the methodologies discussed herein may be executed. For example, the instructions 1602 may cause the machine 1600 to execute any one or more operations of the methods described herein, and/or to implement one or more components or functions of the systems described herein. The instructions 1602 transform the general, non-programmed machine 1600 into a particular machine 1600 programmed to carry out the described and illustrated functions in the manner described. The machine 1600 may operate as a standalone device or may be coupled (e.g., networked) to other machines. In a networked deployment, the machine 1600 may operate in the capacity of a server machine or a client machine in a server-client network environment, or as a peer machine in a peer-to-peer (or distributed) network environment. The machine 1600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1602, sequentially or otherwise, that specify actions to be taken by the machine 1600. Further, while a single machine 1600 is illustrated, the term "machine" shall also be taken to include a collection of machines that individually or jointly execute the instructions 1602 to perform any one or more of the methodologies discussed herein. In some examples, the machine 1600 may comprise both client and server systems, with certain operations of a particular method or algorithm being performed on the server-side and with certain operations of the particular method or algorithm being performed on the client-side.

The machine 1600 may include processors 1604, memory 1606, and input/output I/O components 1608, which may be configured to communicate with each other via a bus 1610. In an example, the processors 1604 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1612 and a processor 1614 that execute the instructions 1602. The term "processor" is intended to include multi-core processors that may comprise two or more independent processors (sometimes referred to as "cores") that may execute instructions contemporaneously. Although FIG. 16 shows multiple processors 1604, the machine 1600 may include a single processor with a single-core, a single processor with multiple cores (e.g., a multi-core processor), multiple processors with a single core, multiple processors with multiples cores, or any combination thereof.

The memory 1606 includes a main memory 1616, a static memory 1618, and a storage unit 1620, both accessible to the processors 1604 via the bus 1610. The main memory 1606, the static memory 1618, and storage unit 1620 store the instructions 1602 embodying any one or more of the methodologies or functions described herein. The instructions 1602 may also reside, completely or partially, within the main memory 1616, within the static memory 1618, within machine-readable medium 1622 within the storage unit 1620, within at least one of the processors 1604 (e.g., within the processor's cache memory), or any suitable combination thereof, during execution thereof by the machine 1600.

The I/O components 1608 may include a wide variety of components to receive input, provide output, produce output, transmit information, exchange information, capture measurements, and so on. The specific I/O components 1608 that are included in a particular machine will depend on the type of machine. For example, portable machines such as mobile phones may include a touch input device or other such input mechanisms, while a headless server machine will likely not include such a touch input device. It will be appreciated that the I/O components 1608 may include many other components that are not shown in FIG. 16. In various examples, the I/O components 1608 may include user output components 1624 and user input components 1626. The user output components 1624 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1626 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

Communication may be implemented using a wide variety of technologies. The I/O components 1608 further include communication components 1628 operable to couple the machine 1600 to a network 1630 or devices 1632 via respective coupling or connections. For example, the communication components 1628 may include a network interface component or another suitable device to interface with the network 1630. In further examples, the communication components 1628 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1632 may be another machine or any of a wide variety of peripheral devices (e.g., a peripheral device coupled via a USB).

Moreover, the communication components 1628 may detect identifiers or include components operable to detect identifiers. For example, the communication components 1628 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph™, MaxiCode, PDF417, Ultra Code, UCC RSS-2D bar code, and other optical codes), or acoustic detection components (e.g., microphones to identify tagged audio signals). In addition, a variety of information may be derived via the communication components 1628, such as location via Internet Protocol (IP) geolocation, location via Wi-Fi® signal triangulation, location via detecting an NFC beacon signal that may indicate a particular location, and so forth.

The various memories (e.g., main memory 1616, static memory 1618, and memory of the processors 1604) and storage unit 1620 may store one or more sets of instructions and data structures (e.g., software) embodying or used by any one or more of the methodologies or functions described herein. These instructions (e.g., the instructions 1602), when executed by processors 1604, cause various operations to implement the disclosed examples.

The instructions 1602 may be transmitted or received over the network 1630, using a transmission medium, via a network interface device (e.g., a network interface component included in the communication components 1628) and using any one of several well-known transfer protocols (e.g., hypertext transfer protocol (HTTP)). Similarly, the instructions 1602 may be transmitted or received using a transmission medium via a coupling (e.g., a peer-to-peer coupling) to the devices 1632.

Described examples of receiver termination detection circuits seek to provide technical solutions to one or more of a number of technical problems, which can include one or more of the following.

First, conventional receiver detection circuits only support single-ended AC-coupled termination detection as used in PCIe, limiting their use in systems that need to support multiple protocols. The described dual-mode receiver termination detection circuit 710 can potentially identify both single-ended and differential termination. The circuit includes mode selection logic to configure operation for either AC-coupled single-ended detection (e.g., at 40-60 ohm) or DC-coupled differential detection (e.g., at 80-120 ohm), potentially enabling support for both PCIe and USB protocols in the same dual-mode transmit circuit 700 design.

Second, AC-coupled links require approximately 100 microseconds for coupling capacitor charging before link initialization can complete, introducing significant startup latency. The described dual-mode receiver termination detection circuit 710 can potentially support DC-coupled differential operation, which eliminates coupling capacitor charging delays. The programmable time delay used by the digital control logic 712 can potentially be reduced from 100 microseconds to 1 microsecond for DC-coupled links, providing up to 100× faster link initialization.

Third, single-ended receiver termination tends to consume more power than differential receiver termination due to constant current flow through termination resistors to ground. The described dual-mode receiver termination detection circuit 710 can potentially enable differential termination detection, which allows use of differential receiver termination, potentially reducing driver power consumption by 50% compared to single-ended termination by eliminating DC current paths to ground. The programmable pull-up/pull-down resistors of the dual-mode receiver termination detection circuit 710 can also allow optimization of common-mode voltage and charging characteristics for lower power operation.

Fourth, AC coupling capacitors (e.g., 100-400 nF) can consume significant board area in space-constrained systems like wearable devices. Support for DC-coupled differential detection can eliminate the need for large coupling capacitors, potentially reducing board area requirements. The dual-mode capability can allow systems to choose between AC and DC coupling based on area versus isolation requirements.

Fifth, different protocols and applications have varying termination requirements that conventional detection circuits may be unable to accommodate. The programmable architecture of the described dual-mode receiver termination detection circuit 710 with programmable resistors, reference voltages, and timing can enable support for different termination schemes and detection parameters. The same dual-mode transmit circuit 700 can potentially be used across multiple protocols and applications by programming the appropriate mode and parameters through software control.

In view of the disclosure above, various examples are set forth below. It should be noted that one or more features of an example, taken in isolation or combination, should be considered within the disclosure of this application.

Example 1 is a device, comprising: a transmitter circuit having positive and negative output nodes; and a receiver termination detection circuit to identify valid receiver termination of a data link, the receiver termination detection circuit comprising: programmable resistors coupled to the positive and negative output nodes; a first voltage comparator coupled to the positive output node and having a positive reference voltage input for comparison to a voltage of the positive output node; a second voltage comparator coupled to the negative output node and having a negative reference voltage input, independent of the positive reference voltage input, for comparison to a voltage of the negative output node; a mode selection input to select between a single-ended detection mode for identifying single-ended receiver termination and a differential detection mode for identifying differential receiver termination; and control logic coupled to the mode selection input and the first and second voltage comparators to: in the single-ended detection mode, cause the positive and negative output nodes to be driven concurrently; in the differential detection mode, cause the positive and negative output nodes to be driven differentially; and sample outputs of the voltage comparators after a programmable time delay to detect receiver termination of the data link.

In Example 2, the subject matter of Example 1 includes, mode selection logic coupled to the mode selection input comprising multiplexers and inverters configured to generate pull-up and pull-down control signals to control the programmable resistors based on the mode selection input.

In Example 3, the subject matter of Examples 1-2 includes, wherein: the control logic comprises data flip-flops clocked by a clock signal to sample the outputs of the voltage comparators.

In Example 4, the subject matter of Examples 1-3 includes, wherein: the programmable resistors are pull-up and pull-down resistors programmable to adjust an initial common-mode voltage of the positive and negative output nodes.

In Example 5, the subject matter of Examples 1-4 includes, reference voltage generation logic controlled by a receiver detection disable signal to drive voltages of the positive and negative reference voltage inputs.

In Example 6, the subject matter of Examples 1-5 includes, wherein: in the single-ended detection mode, the control logic causes the positive and negative output nodes to be driven to a same voltage level.

In Example 7, the subject matter of Example 6 includes, wherein the control logic identifies valid single-ended receiver termination by sampling both of the comparator outputs at a same logic level.

In Example 8, the subject matter of Examples 1-7 includes, wherein: in the differential detection mode, the control logic causes the positive and negative output nodes to be driven to different voltage levels.

In Example 9, the subject matter of Examples 1-8 includes, wherein: the programmable time delay is set to a first duration for DC-coupled operation; the programmable time delay is set to a second duration for AC-coupled operation; and the second duration is at least ten times the first duration.

In Example 10, the subject matter of Example 9 includes, wherein: the first duration is between 0.5 and 5 microseconds.

In Example 11, the subject matter of Examples 1-10 includes, wherein: in the single-ended detection mode, the positive and negative reference voltage inputs have their voltages set to approximately between 0.75 times a supply voltage.

In Example 12, the subject matter of Examples 1-11 includes, wherein: in the differential detection mode: the voltage of the positive reference voltage input is set to approximately 0.625 times a supply voltage; and the voltage of the negative reference voltage input is set to approximately 0.375 times the supply voltage.

In Example 13, the subject matter of Examples 1-12 includes, wherein: in the single-ended detection mode and the differential detection mode, valid receiver termination is identified where the logic levels of the outputs of the voltage comparators remain unchanged.

In Example 14, the subject matter of Examples 1-13 includes, wherein: in the single-ended detection mode and the differential detection mode, invalid differential receiver termination is identified where the logic levels of the outputs of the voltage comparators change.

In Example 15, the subject matter of Examples 1-14 includes, wherein: the programmable resistors are configured to control charging time characteristics during termination detection.

In Example 16, the subject matter of Examples 1-15 includes, wherein: the control logic is configured to transition from a detection mode to a normal operation mode after detecting valid termination by enabling the transmitter circuit and disabling the receiver termination detection circuit.

In Example 17, the subject matter of Example 16 includes, wherein: the control logic causes common-mode voltage to be maintained at the positive and negative output nodes when transitioning between the detection mode and the normal operation mode.

In Example 18, the subject matter of Examples 1-17 includes, wherein: the device supports: AC-coupled single-ended receiver termination with termination impedance between 40 ohms and 200 ohms; and DC-coupled differential receiver termination with termination impedance between 80 ohms and 400 ohms.

Example 19 is a method for identifying receiver termination of a wireline datalink, the method comprising: receiving a mode selection input to select between a single-ended detection mode for identifying single-ended receiver termination of a data link and a differential detection mode for identifying differential receiver termination of the data link; controlling programmable resistors to drive voltages of positive and negative output nodes of a transmitter circuit based on the mode selection input; comparing the voltage of the positive output node to a positive reference voltage input of a first voltage comparator to generate a first comparator output; comparing the voltage of the negative output node to a negative reference voltage input of a second voltage comparator to generate a second comparator output; and sampling the first comparator output and second comparator output after a programmable time delay to detect receiver termination of the data link.

Example 20 is a device, comprising: means for transmitting signals, comprising positive and negative output nodes; and means for identifying valid receiver termination of a data link, comprising: means for providing programmable resistance coupled to the positive and negative output nodes; means for comparing a voltages at the positive output node to a positive reference voltage; means for comparing a voltage at the negative output node to a negative reference voltage; means for selecting between a single-ended detection mode for detecting single-ended receiver termination and a differential detection mode for detecting differential receiver termination; and means for controlling the detection of the receiver termination, comprising: means for causing the positive and negative output nodes to be driven concurrently in the single-ended detection mode; means for causing the positive and negative output nodes to be differentially driven in the differential detection mode; and means for sampling outputs of the voltage comparing means after a programmable time delay to detect receiver termination of the data link.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

"Component" refers, for example, to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers, for example, to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Machine storage medium" refers, for example, to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers, for example, to a tangible medium that is capable of storing, encoding, or carrying the instructions for execution by a machine.

"Signal medium" refers, for example, to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A device, comprising:
a transmitter circuit having positive and negative output nodes; and
a receiver termination detection circuit to identify valid receiver termination of a data link, the receiver termination detection circuit comprising:
programmable resistors coupled to the positive and negative output nodes;
a first voltage comparator coupled to the positive output node and having a positive reference voltage input for comparison to a voltage of the positive output node;
a second voltage comparator coupled to the negative output node and having a negative reference voltage input, independent of the positive reference voltage input, for comparison to a voltage of the negative output node;
a mode selection input to select between a single-ended detection mode for identifying single-ended receiver termination and a differential detection mode for identifying differential receiver termination; and
control logic coupled to the mode selection input and the first and second voltage comparators to:

in the single-ended detection mode, cause the positive and negative output nodes to be driven concurrently;

in the differential detection mode, cause the positive and negative output nodes to be driven differentially; and sample outputs of the voltage comparators after a programmable time delay to detect receiver termination of the data link.

2. The device of claim 1, further comprising:

mode selection logic coupled to the mode selection input comprising multiplexers and inverters configured to generate pull-up and pull-down control signals to control the programmable resistors based on the mode selection input.

3. The device of claim 1, wherein:

the control logic comprises data flip-flops clocked by a clock signal to sample the outputs of the voltage comparators.

4. The device of claim 1, wherein:

the programmable resistors are pull-up and pull-down resistors programmable to adjust an initial common-mode voltage of the positive and negative output nodes.

5. The device of claim 1, further comprising:

reference voltage generation logic controlled by a receiver detection disable signal to drive voltages of the positive and negative reference voltage inputs.

6. The device of claim 1, wherein:

in the single-ended detection mode, the control logic causes the positive and negative output nodes to be driven to a same voltage level.

7. The device of claim 6, wherein the control logic identifies valid single-ended receiver termination by sampling both of the comparator outputs at a same logic level.

8. The device of claim 1, wherein:

in the differential detection mode, the control logic causes the positive and negative output nodes to be driven to different voltage levels.

9. The device of claim 1, wherein:

the programmable time delay is set to a first duration for DC-coupled operation;

the programmable time delay is set to a second duration for AC-coupled operation; and the second duration is at least ten times the first duration.

10. The device of claim 9, wherein:

the first duration is between 0.5 and 5 microseconds.

11. The device of claim 1, wherein:

in the single-ended detection mode, the positive and negative reference voltage inputs have their voltages set to approximately between 0.75 times a supply voltage.

12. The device of claim 1, wherein:

in the differential detection mode:

the voltage of the positive reference voltage input is set to approximately 0.625 times a supply voltage; and the voltage of the negative reference voltage input is set to approximately 0.375 times the supply voltage.

13. The device of claim 1, wherein:

in the single-ended detection mode and the differential detection mode, valid receiver termination is identified where the logic levels of the outputs of the voltage comparators remain unchanged.

14. The device of claim 1, wherein:

in the single-ended detection mode and the differential detection mode, invalid differential receiver termination is identified where the logic levels of the outputs of the voltage comparators change.

15. The device of claim 1, wherein:

the programmable resistors are configured to control charging time characteristics during termination detection.

16. The device of claim 1, wherein:

the control logic is configured to transition from a detection mode to a normal operation mode after detecting valid termination by enabling the transmitter circuit and disabling the receiver termination detection circuit.

17. The device of claim 16, wherein:

the control logic causes common-mode voltage to be maintained at the positive and negative output nodes when transitioning between the detection mode and the normal operation mode.

18. The device of claim 1, wherein:

the device supports:

AC-coupled single-ended receiver termination with termination impedance between 40 ohms and 200 ohms; and DC-coupled differential receiver termination with termination impedance between 80 ohms and 400 ohms.

19. A method for identifying receiver termination of a wireline datalink, the method comprising:

receiving a mode selection input to select between a single-ended detection mode for identifying single-ended receiver termination of a data link and a differential detection mode for identifying differential receiver termination of the data link;

controlling programmable resistors to drive voltages of positive and negative output nodes of a transmitter circuit based on the mode selection input;

comparing the voltage of the positive output node to a positive reference voltage input of a first voltage comparator to generate a first comparator output;

comparing the voltage of the negative output node to a negative reference voltage input of a second voltage comparator to generate a second comparator output; and sampling the first comparator output and second comparator output after a programmable time delay to detect receiver termination of the data link.

20. A device, comprising:

means for transmitting signals, comprising positive and negative output nodes; and means for identifying valid receiver termination of a data link, comprising:

means for providing programmable resistance coupled to the positive and negative output nodes;

means for comparing a voltages at the positive output node to a positive reference voltage;

means for comparing a voltage at the negative output node to a negative reference voltage;

means for selecting between a single-ended detection mode for detecting single-ended receiver termination and a differential detection mode for detecting differential receiver termination; and means for controlling the detection of the receiver termination, comprising:

means for causing the positive and negative output nodes to be driven concurrently in the single-ended detection mode;

means for causing the positive and negative output nodes to be differentially driven in the differential detection mode; and means for sampling outputs of the voltage comparing
means after a programmable time delay to detect
receiver termination of the data link.

* * * * *